(12) United States Patent
Suzuki et al.

(10) Patent No.: US 9,022,559 B2
(45) Date of Patent: May 5, 2015

(54) PROGRESSIVE-POWER LENS DESIGNING METHOD, PROGRESSIVE POWER LENS DESIGNING SYSTEM, AND PROGRESSIVE-POWER LENS

(75) Inventors: Yohei Suzuki, Minami-Minowa-mura (JP); Takateru Mori, Minowa-machi (JP); Ayumu Ito, Minowa-machi (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 1097 days.

(21) Appl. No.: 13/041,147

(22) Filed: Mar. 4, 2011

(65) Prior Publication Data

US 2011/0222019 A1 Sep. 15, 2011

(30) Foreign Application Priority Data

Mar. 10, 2010 (JP) ................................ 2010-052579
Jun. 15, 2010 (JP) ................................ 2010-135976
Dec. 15, 2010 (JP) ................................ 2010-279311

(51) Int. Cl.
G02C 7/06 (2006.01)
G02C 7/02 (2006.01)

(52) U.S. Cl.
CPC ................ *G02C 7/066* (2013.01); *G02C 7/024* (2013.01); *G02C 7/025* (2013.01)

(58) Field of Classification Search
CPC ......... G02C 7/024; G02C 7/025; G02C 7/066
USPC ............................ 351/159.42, 159.76, 159.77
See application file for complete search history.

(56) References Cited

U.S. PATENT DOCUMENTS

| | | | |
|---|---|---|---|
| 4,537,479 A | 8/1985 | Shinohara et al. | |
| 4,786,160 A | 11/1988 | Furter | |
| 6,123,422 A | 9/2000 | Menezes et al. | |
| 6,318,859 B1 | 11/2001 | Baudart et al. | |
| 6,827,443 B2 | 12/2004 | Fisher et al. | |
| 7,540,611 B2 | 6/2009 | Welk et al. | 351/177 |
| 7,740,358 B2 | 6/2010 | Pedrono et al. | 351/246 |
| 7,980,692 B2 | 7/2011 | Fisher et al. | |
| 2007/0252949 A1 | 11/2007 | Altheimer et al. | |
| 2008/0033836 A1 | 2/2008 | Shinohara et al. | 705/26 |
| 2010/0097570 A1 | 4/2010 | Katzman et al. | |

FOREIGN PATENT DOCUMENTS

| | | |
|---|---|---|
| FR | 2753805 A | 3/1998 |
| GB | 1569766 A | 6/1980 |
| GB | 2146791 A | 4/1985 |

(Continued)

OTHER PUBLICATIONS

Extended European search report dated Jul. 8, 2011 for corresponding European application 11157521.3 cites the U.S. patent and foreign patent documents.

*Primary Examiner* — Scott J Sugarman
(74) *Attorney, Agent, or Firm* — DLA Piper LLP (US)

(57) ABSTRACT

A progressive-lens designing system includes a manufacturer-side terminal installed in a lens manufacturer connected to a shop-side terminal installed in a spectacle shop or any other location via a network. The manufacturer-side terminal includes an optimization coefficient setting section that uses a variety of data received from the shop-side terminal to set an optimization coefficient for each target object in specific work, a dioptric power computing section that computes target dioptric power for each target object, a lens designing section that performs lens design, and an order processing section that performs order processing when receiving an order placed from the shop-side terminal.

8 Claims, 16 Drawing Sheets

(56) References Cited

FOREIGN PATENT DOCUMENTS

| | | |
|---|---|---|
| JP | 6230216 A | 2/1987 |
| JP | 2005-500585 | 1/2005 |
| JP | 2005201979 A | 7/2005 |
| JP | 2007509374 A | 4/2007 |
| JP | 2008-036997 | 2/2008 |
| JP | 2008-511033 | 4/2008 |
| WO | 0162139 A1 | 8/2001 |
| WO | 03019269 A2 | 3/2003 |
| WO | 03052491 A1 | 6/2003 |

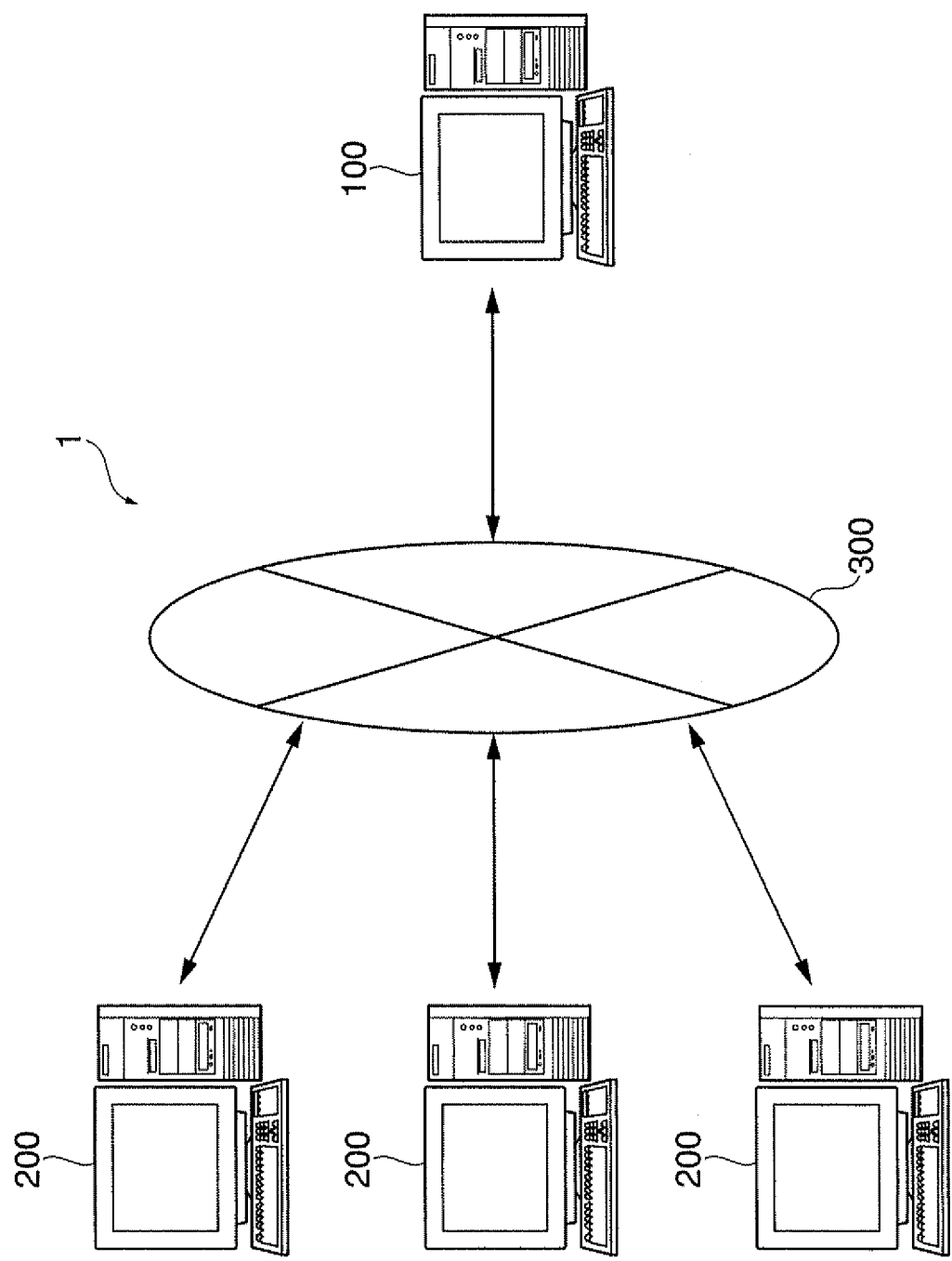

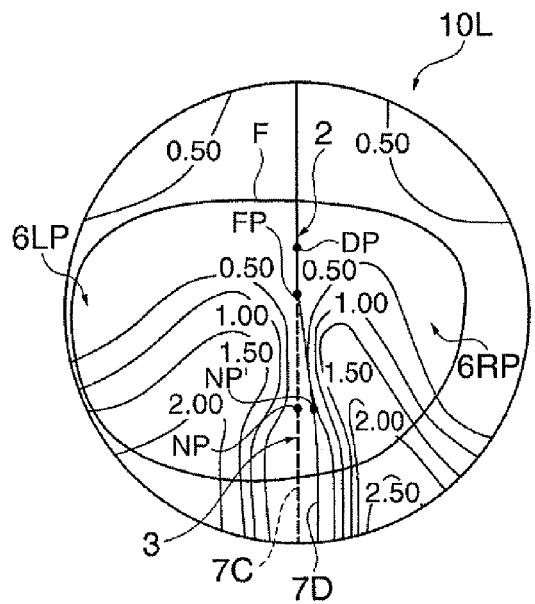
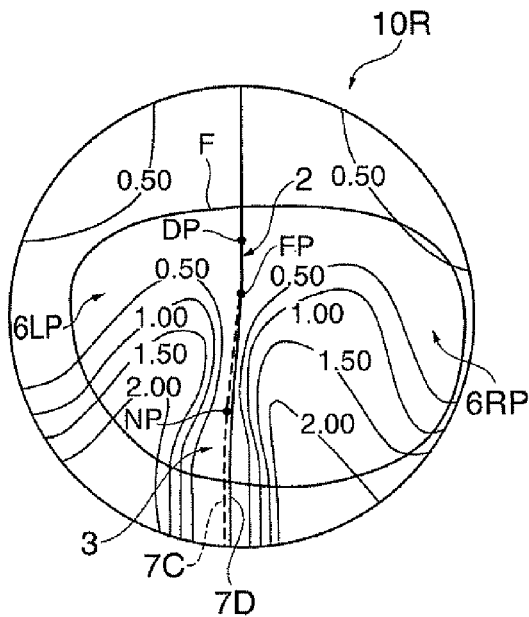
FIG. 10A    FIG. 10B
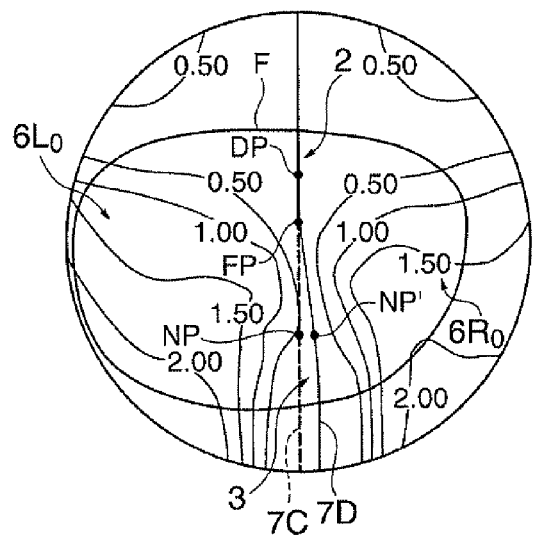
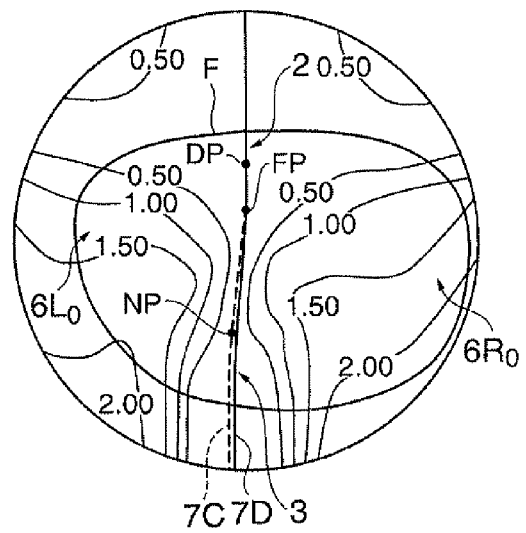
FIG. 11A    FIG. 11B

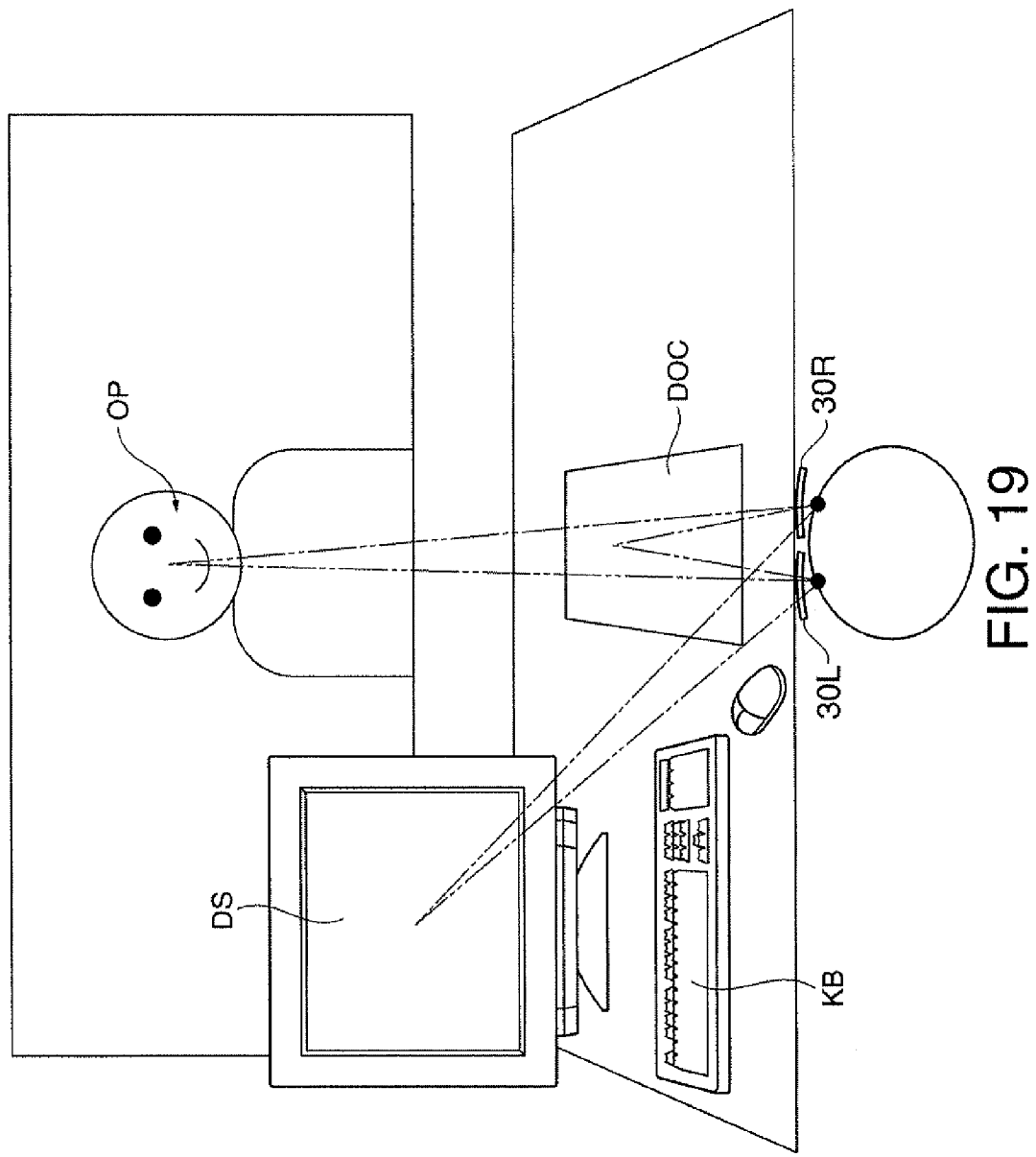

PROGRESSIVE-POWER LENS DESIGNING METHOD, PROGRESSIVE POWER LENS DESIGNING SYSTEM, AND PROGRESSIVE-POWER LENS

BACKGROUND

1. Technical Field

The present invention relates to a method for designing a progressive-power lens used in specific work, a progressive-power lens designing system, and a progressive-power lens.

2. Related Art

A progressive-power lens typically includes a near region corresponding to near vision, a far region disposed above the near region and corresponding to far vision, a progressive region which is disposed between the far and near regions and where the power continuously changes, and intermediate side regions provided on both sides of the progressive region.

The near region, the far region, and the progressive region are distinct vision regions through which target objects are distinctly viewed, whereas the intermediate side regions located on both sides of the progressive region are not used to distinctly view the target objects. Therefore, when a spectacle wearer moves the line of sight into any of the intermediate side regions, the wearer senses blurring due to astigmatism or a dioptric power error.

There has been a proposed progressive-power spectacle lens suitable for car driving, a lens suitable for personal computer operation, and lenses dedicated to other applications. A spectacle lens of this type is so designed that the sizes of the far and near regions, the length of a progressive corridor, and aspheric coefficients are appropriately adjusted.

To increase the width of the field of view perceived by the spectacle wearer, there is a spectacle lens designed by determining a deviation of a saggital plane of the spectacle wearer from a standard saggital plane, selecting an optimization target as the function of the deviation, and performing optimization based on the target (JP-T-2008-511033).

There is also a known method for designing a progressive-power lens suitable for a specific application by setting the distances to objects in a far field and a near field and the ability of accommodation for the objects (see JP-T-2005-500585).

There is another known method for providing a progressive-power lens suitable for the wearer in a specific application by checking how a lens fits the wearer based on a scene object image appropriately representing the intended use of the lens and selecting an optimum lens (see JP-A-2008-39997).

In a progressive-power lens of related art, in which the far and near regions are used to distinctly view a target object, when a spectacle wearer moves the line of sight from these regions to any of the intermediate side regions located to the right and left thereof, the spectacle wearer suffers from blurring due to astigmatism or a dioptric power error. For example, a spectacle wearer who is driving a car uses the far region when directing the line of sight toward a car running in front of the car driven by the wearer, a traffic light, or any other object, whereas using the near region when directing the line of sight toward an on-vehicle indicator immediately in front of the wearer. On the other hand, when the wearer moves the line of sight toward a side-view mirror provided on a side of the car, the wearer suffers from blurring because the line of sight passes through the corresponding intermediate side region. To avoid the blurring, the wearer needs to turn his or her head rightward or leftward toward the side-view mirror.

There is a progressive-power lens optimized for car driving by adjusting the sizes of the near and far regions and aspheric coefficients. Using the lens, however, still cannot sufficiently enlarge a distinct vision area and the wearer suffers from blurring when moving the line of sight into any of the intermediate side regions, resulting in difficulty distinctly viewing an object.

The related art described in JP-T-2008-511033 only considers the dominant eye but does not enlarge the distinct vision area for a specific application. That is, when the wearer does not turn his or her head but moves the line of sight, the wearer suffers from blurring, as in the case of the progressive-power lens of related art described above.

The progressive-power lenses described in JP-T-2005-500585 and JP-A-2008-39997 similarly cause the wearer to suffer from blurring when the wearer does not turn his or her head but moves the line of sight.

The problem with the spectacle lens described above occurs not only in car driving but also in personal computer operation and other applications.

SUMMARY

An advantage of some aspects of the invention is to provide a method for designing a progressive-power lens optimized for a specific work environment, a progressive-power lens designing system, and a progressive-power lens.

A progressive-power lens designing method according to a first aspect of the invention is a progressive-power lens designing method for designing a progressive-power lens having two distinct vision points and at least one quasi-distinct vision point, the method including setting priorities among at least three target objects viewed through the progressive-power lens, assigning a point on the progressive-power lens through which a target object having a third or lower level of the priorities is viewed as the quasi-distinct vision point and setting an optimization coefficient for the target object based on the distance between the quasi-distinct vision point and the target object and the magnitude of change in the distance, setting dioptric power necessary at the quasi-distinct vision point by using a predetermined method, and optimizing the amounts of aberrations and a dioptric power error at the quasi-distinct vision point based on the optimization coefficient and the dioptric power.

The progressive-power lens according to the first aspect of the invention allows the spectacle wearer not only to distinctly view two target objects through two distinct vision points but also to distinctly view a target object for specific work through a quasi-distinct vision point.

In the first aspect of the invention, priorities among at least three target objects on which the spectacle wearer fixes his or her eyes in a specific work environment are set, and the position through which the line of sight from the spectacle wearer who is viewing a target object having a three or lower level of the priorities passes is assigned as a quasi-distinct vision point. Thereafter, an optimization coefficient for each quasi-distinct vision point is set, and dioptric power necessary to view the target object through the corresponding quasi-distinct vision point is set by using a predetermined method. Each quasi-distinct vision point is then optimized based on the optimization coefficient and the set dioptric power. The predetermined method for setting dioptric power may, for example, be calculating dioptric power based on prescribed far dioptric power of the spectacle wearer and the distance between each quasi-distinct vision point and a target object or setting dioptric power by using preset dioptric power as the dioptric power at the quasi-distinct vision point.

A typical progressive-power lens can be so designed that necessary dioptric power is provided at each of the two distinct vision points in a far region and a near region. It is, however, difficult to provide necessary dioptric power at arbitrary three or more points. To address the problem, the lens design is performed as follows: First, distinct vision points through which target objects having second or higher levels of the priorities are viewed are so designed that necessary dioptric power is provided at each of the distinct vision points. Thereafter, to design a quasi-distinct vision point, aberrations and a dioptric power error with respect to the necessary dioptric power are adjusted. At the quasi-distinct vision point, an optimization coefficient is set based on the distance to a target object and the magnitude of change in the distance. For example, when the distance to the target object is large, the optimization needs to be dioptric power-oriented. On the other hand, when the magnitude of change in the distance is large, which is a case where the target object moves, the optimization does not need to be dioptric power-oriented because dioptric power according to the distance is not determined. In this case, the optimization needs to be aberration-oriented.

As described above, a quasi-distinct vision point is set in a non-distinct vision area where progressive-power lens of related art cannot provide distinct vision, and lens design is performed in accordance with the characteristics of a target object viewed through the quasi-distinct vision point. Therefore, providing a quasi-distinct vision point dedicated to specific work in a non-distinct vision area including no distinct vision point in related art allows the lens wearer to view the target object comfortably with less blurring in the specific work.

Further, using the optimization coefficient as an index to perform design allows the lens design to be readily performed.

Moreover, in the first aspect of the invention, since target objects having first and second levels of the priorities are viewed through the two distinct vision points on the progressive-power lens, the design is performed in the same manner as in related art.

In the progressive-power lens according to the first aspect of the invention, the progressive-power lens is preferably a spectacle lens for car driving. A target object having a third or lower level of the priorities is preferably a side-view mirror of a car. The optimization is preferably performed by reducing aberrations at the quasi-distinct vision point in the first place.

When a driver views a side-view mirror during driving a car, the driver views an image formed on the side-view mirror. The image formed on the side-view mirror is scenery that continuously changes. That is, the distance to an object in the scenery formed on the side-view mirror greatly changes. The optimization at the quasi-distinct vision point on the lens surface through which the side-view mirror is viewed therefore needs to be aberration-oriented irrespective of the distance from the quasi-distinct vision point to the side-view mirror. The reason for this is that visibility is not improved by optimizing the amount of a dioptric power error at the quasi-distinct vision point through which the side-view mirror is viewed. Performing aberration-oriented optimization therefore allows the spectacle wearer to view the side-view mirror more comfortably. A lens optimized for a specific work environment of car driving can be thus designed.

The progressive-power lens designing method according to the first aspect of the invention preferably further includes measuring the frequency at which the target objects are viewed with a sight line direction measurement apparatus and determining priorities among the target objects in descending order of the frequency.

In the above configuration of the first aspect of the invention, using a sight line direction measurement apparatus allows the direction of the line of sight in a specific work environment to be readily measured, and the priorities among the target objects can be readily determined based on measurement results.

The progressive-power lens designing method according to the first aspect of the invention, which is implemented with a progressive-power lens designing system in which a shop-side terminal is connected via a network to a manufacturer-side terminal installed in a lens manufacturer, preferably further includes an input step of inputting the following information to the shop-side terminal: basic information on the progressive-power lens including prescribed far dioptric power of a spectacle wearer and information on a specific work environment including the directions of at least three target objects on which the spectacle wearer fixes his or her eyes in the specific work environment, the distances thereto, the magnitudes of change, in the distances, and the priorities among the target objects, a transmission and reception step of transmitting the basic information and the information on the specific work environment from the shop-side terminal to the manufacturer-side terminal, an optimization coefficient setting step performed by the manufacturer-side terminal, the optimization coefficient setting step formed of assigning points on the progressive-power lens through which target objects having second and higher levels of the priorities among the target objects are viewed as distinct vision points, assigning a point on the progressive-power lens through which a target object having a third or lower level of the priorities among the target objects is viewed as a quasi-distinct vision point, and setting an optimization coefficient at the quasi-distinct vision point based on the distance and the magnitude of change in the distance, a dioptric power computation step of determining the positions of the distinct vision points and the quasi-distinct vision point based on the directions of the target objects and computing dioptric power necessary for each of the distinct vision points and the quasi-distinct vision point based on the prescribed far dioptric power and the distance to the corresponding target object, a lens design step of performing lens design by optimizing the amounts of aberrations and dioptric power errors at the distinct vision points and the quasi-distinct vision point based on the optimization coefficient and the dioptric power, a transmission and reception step of transmitting design data obtained in the lens design step from the manufacturer-side terminal to the shop-side terminal, and a result processing step of outputting the design data on a screen of the shop-side terminal.

The shop-side terminal is typically installed in a spectacle shop where spectacle lenses are sold. In a spectacle shop, a shop attendant acquires information on a customer and measures a variety of data on a spectacle lens for the customer.

The basic information on a progressive-power lens includes parameters necessary to design the progressive-power lens including prescription data, such as prescribed far dioptric power, spherical dioptric power, astigmatic dioptric power, a cylinder axis, prismatic dioptric power, a base setting, addition diopter, and a far interpupillary distance; frame data, such as the name of the manufacture of a frame selected by the customer, the type of the frame, the lens portion width of the frame, the nasal breadth of the frame, and the vertical width of the frame; and fitting data, such as the height of a far eyepoint, the vertex distance, and the pantoscopic angle of the frame selected by the customer.

In the above configuration of the first aspect of the invention, the shop-side terminal is connected to the manufacturer-side terminal via a network, and data are transmitted and received between the shop-side terminal and the manufacturer-side terminal. It is therefore possible to design a lens in the manufacturer-side terminal based on the variety of data inputted through the shop-side terminal and transmit the design result to the shop-side terminal where the design result is quickly displayed, for example, on a screen, whereby design data on the lens can be quickly presented to the customer. Communication between the shop attendant and the customer is thus improved. As described above, since the spectacle shop, the lens manufacturer, and the customer readily cooperate with each other, a wide range of service can be provided to the customer.

Further, connecting a plurality of shop-side terminals to the manufacturer-side terminal via a network and performing lens design in the manufacturer-side terminal allow a variety of data from each shop to be concentrated in one place, whereby security is improved. Moreover, the variety of data can readily be updated because the data are concentrated in one place. Still further, performing lens design in the manufacturer-side terminal allows, for example, the lens manufacturer to omit distributing a lens design program to the shop-side terminals, preventing lens design quality to differ from shop to shop.

A progressive-power lens designing system according to a second aspect of the invention includes a shop-side terminal and a manufacturer-side terminal installed in a lens manufacturer and connected to the shop-side terminal via a network, the shop-side terminal including an input section to which the following information can be inputted: basic information on the progressive-power lens including prescribed far dioptric power of a spectacle wearer and information on a specific work environment including the directions of at least three target objects on which the spectacle wearer fixes his or her eyes in the specific work environment, the distances thereto, and the magnitudes of change in the distances and priorities among the target objects, a shop-side transmission and reception section that transmits the basic information and the information on the specific work environment to the manufacturer-side terminal and receives design data from the manufacturer-side terminal, and a result processing section that outputs the design data on a designed lens received from the manufacturer-side terminal, and the manufacturer-side terminal including a manufacturer-side transmission and reception section that receives the basic information and the information on the specific work environment from the shop-side terminal and transmits the design data to the shop-side terminal, an optimization coefficient processing section that assigns points on the progressive-power lens through which target objects having second and higher levels of the priorities among the target objects are viewed as distinct vision points, assigns a point on the progressive-power lens through which a target object having a third or lower level of the priorities among the target objects is viewed as a quasi-distinct vision point, and setting an optimization coefficient at the quasi-distinct vision point based on the distance and the magnitude of change in the distance, a dioptric power computing section that determines the positions of the distinct vision points and the quasi-distinct vision point based on the directions of the target objects and computes dioptric power necessary for each of the distinct vision points and the quasi-distinct vision point based on the prescribed far dioptric power and the distance to the corresponding target object, and a lens designing section that performs lens design by optimizing the amounts of aberrations and dioptric power errors at the distinct vision points and the quasi-distinct vision point based on the optimization coefficient and the dioptric power.

The second aspect of the invention can provide the same advantageous effects as those provided in the progressive-power lens designing method.

That is, a quasi-distinct vision point is set in a non-distinct vision area where a progressive-power lens of related art cannot provide distinct vision, and lens design is performed in accordance with the characteristics of a target object viewed through the quasi-distinct vision point. Therefore, providing a quasi-distinct vision point dedicated to specific work in a non-distinct vision area including no distinct vision point in related art allows the spectacle wearer to view the target object comfortably with less blurring in the specific work.

Further, using the optimization coefficient as an index to perform automatic design allows the lens design to be readily performed.

Moreover, since the shop-side terminal is connected to the manufacturer-side terminal via a network, design data on a lens can be quickly presented to the customer in the spectacle shop, whereby communication between the shop attendant and the customer is improved. As described above, since the spectacle shop, the lens manufacturer, and the customer readily cooperate with each other, a wide range of service can be provided to the customer.

The progressive-power lens designing system according to the second aspect of the invention preferably further includes an order placing and processing section that places an order for a progressive-power lens from the shop-side terminal to the manufacturer-side terminal based on the design data outputted from the result processing section and performs order processing in accordance with the placed order.

In the above configuration of the second aspect of the invention, the order placing and processing section can place an order for a progressive-power lens from the shop-side terminal to the manufacturer-side terminal, and the manufacturer-side terminal can process the placed order. For example, the shop-side terminal includes an order placing section, and the manufacturer-side terminal includes an order processing section. The order placing section and the order processing section are combined into the order placing and processing section.

In this way, the shop attendant in the spectacle shop or the customer can check the design data outputted on the screen of the shop-side terminal, and a progressive-power lens based on the design data can be ordered promptly. A seamless procedure formed of inputting a variety of data on a specific work environment and a lens, performing lens design, and placing an order can thus be quickly and readily carried out.

The progressive-power lens designing system according to the second aspect of the invention preferably further includes a priority determining section that measures the frequency at which the target objects are viewed with a sight line direction measurement apparatus and determines priorities among the target objects in descending order of the frequency.

In the above configuration of the second aspect of the invention, using a sight line direction measurement apparatus allows the direction of the line of sight in a specific work environment to be readily measured, and the priorities among the target objects can be readily determined based on measurement results.

A progressive-power lens according to a third aspect of the invention includes two distinct vision points, a progressive corridor therebetween, and at least one quasi-distinct vision point in a position different from those of the distinct vision points, and the amount of astigmatism at the quasi-distinct vision point falls within an acceptable range.

In the third aspect of the invention, the spectacle wearer typically distinctly views two target objects through the two distinct vision points and a target object for specific work through the quasi-distinct vision point. The provision of the quasi-distinct vision point dedicated to specific work in a non-distinct vision area including no distinct vision point in related art allows the amount of blurring that occurs in the specific work to be reduced.

In a configuration of the third aspect of the invention, dioptric power at the quasi-distinct vision point is preferably determined based on prescribed far dioptric power, the distance between a preset target object and the quasi-distinct vision point, prescribed addition diopter, and a near working distance for the prescribed addition diopter.

In the above configuration of the third aspect of the invention, since the dioptric power at the quasi-distinct vision point is determined in accordance with the type of specific work, a progressive-power lens further optimized for the application can be provided.

In a configuration of the third aspect of the invention, the position of the quasi-distinct vision point is preferably determined by the direction of a preset target object.

In the above configuration of the third aspect of the invention, since the position of the quasi-distinct vision point is determined in accordance with the type of specific work, a progressive-power lens further optimized for the application can be provided.

One of the two distinct vision points is preferably a distinct vision point through which an outside object is distinctly viewed through a window of a car. The other distinct vision point is preferably a distinct vision point through which an on-vehicle indicator is distinctly viewed. The quasi-distinct vision point is preferably formed of two quasi-distinct vision points that are mirror-dedicated points through which right and left side-view mirrors provided on both sides of the car are distinctly viewed. For example, the distinct vision point through which the on-vehicle indicator is distinctly viewed is designed based on the following conditions: The distance from the center of the eyeball of the spectacle wearer to the on-vehicle indicator is approximately 60 cm and the direction to the on-vehicle indicator is approximately 18 degrees inclined rightward with respect to the front direction.

In the above configuration of the third aspect of the invention, one of the two distinct vision points allows the wearer to view a car running in front of the car driven by the wearer, a traffic light, and other objects. The other distinct vision point allows the wearer to view the on-vehicle indicator disposed immediately in front of the wearer. The quasi-distinct vision points allow the wearer to view the right and left side-view mirrors.

The above configuration of the third aspect of the invention can therefore provide a progressive-power lens optimized for car driving.

One of the two distinct vision points is preferably a distinct vision point through which a display disposed in front of a spectacle wearer is distinctly viewed. The other distinct vision point is preferably a distinct vision point through which a keyboard disposed close to the spectacle wearer is distinctly viewed. The quasi-distinct vision point is preferably a document-dedicated point through which a document disposed to the right or left of the keyboard is distinctly viewed. In the above configuration of the third aspect of the invention, one of the two distinct vision points is a point through which the desktop display set apart from the center of the eyeball of the spectacle wearer, for example, by 50 cm can be distinctly viewed, and the other distinct vision point is a point through which the desktop keyboard set apart from the center of the eyeball of the spectacle wearer, for example, by 30 cm can be distinctly viewed.

In the above configuration of the third aspect of the invention, one of the two distinct vision points allows the spectacle wearer to view the display disposed in front of the wearer. The other distinct vision point allows the spectacle wearer to view the keyboard disposed close to the wearer. The quasi-distinct vision point allows the spectacle wearer to view a document disposed to the right or the left of the keyboard.

The above configuration of the third aspect of the invention can therefore provide a progressive-power lens optimized for personal computer operation.

BRIEF DESCRIPTION OF THE DRAWINGS

The invention will be described with reference to the accompanying drawings, wherein like numbers reference like elements.

FIG. 3 is a communication path diagram showing a progressive-power lens designing system according to the first embodiment.

FIGS. 10A and 10B are astigmatism diagrams in Example 1, FIG. 10A corresponding to the left eye and FIG. 10B corresponding to the right eye.

FIGS. 11A and 11B are astigmatism diagrams in related art, FIG. 11A corresponding to the left eye and FIG. 11B corresponding to the right eye.

FIG. 19 is a schematic view showing a case where progressive-power lenses according to a variation of the invention are used.

DESCRIPTION OF EXEMPLARY EMBODIMENTS

Figure 1:
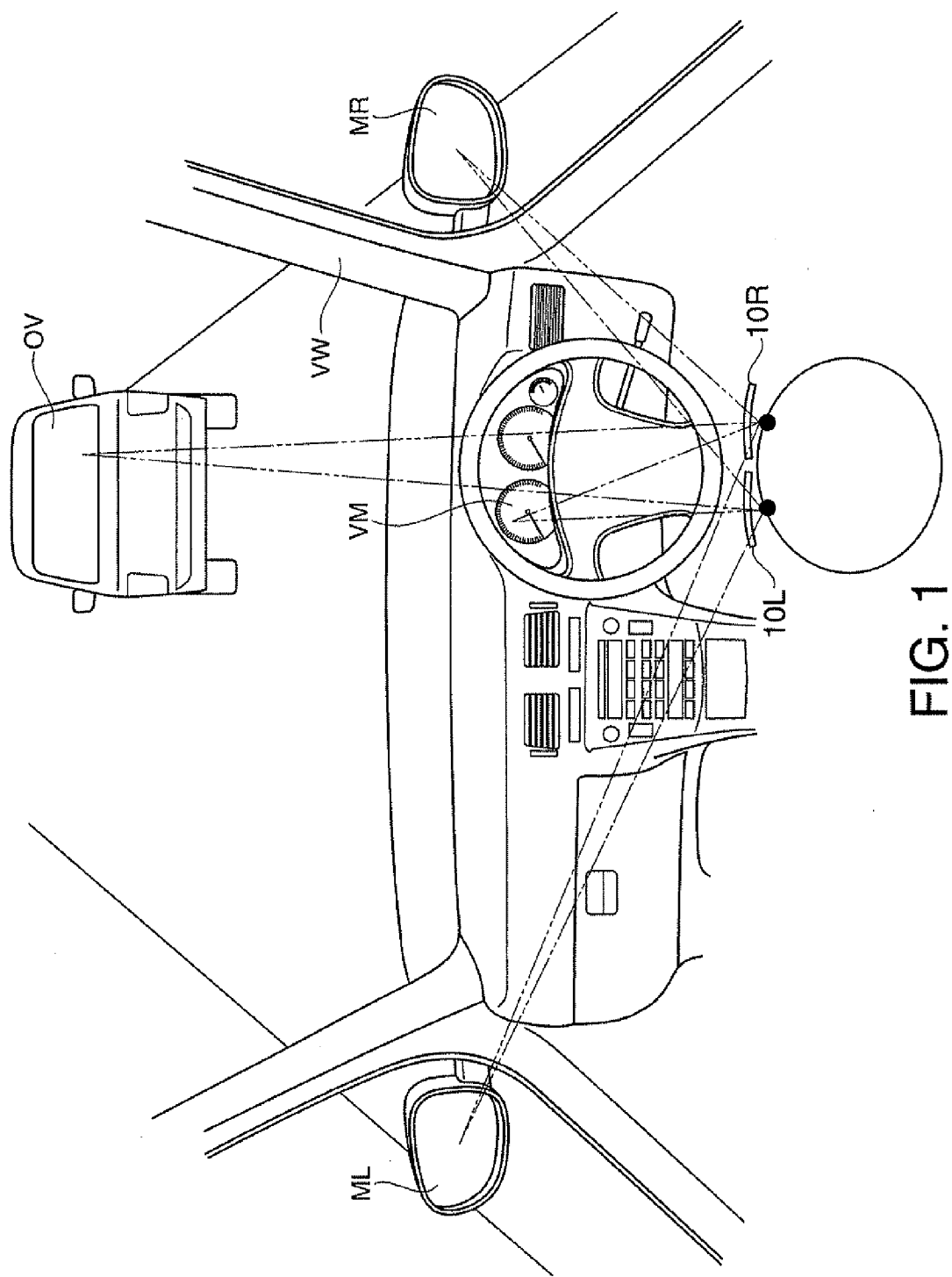
FIG. 1 is a schematic view showing a case where progressive-power lenses according to a first embodiment of the invention are used.

Embodiments of the invention will be described with reference to the drawings. In each of the embodiments, the same components have the same reference characters, and redundant descriptions thereof will be omitted.

First Embodiment

In a first embodiment, progressive-power lenses 10L and 10R are dedicated to car driving, as shown in FIG. 1. The progressive-power lenses 10L and 10R primarily allow a wearer to distinctly view objects outside car windows VW, for example, a vehicle OV running in front of the car driven by the wearer, distinctly view an on-vehicle indicator VM provided inside the car and in front of a driver's seat, and distinctly view side-view mirrors ML and MR provided on both sides of the car.

1. Progressive-Power Lens

Figures 2A, 2B:
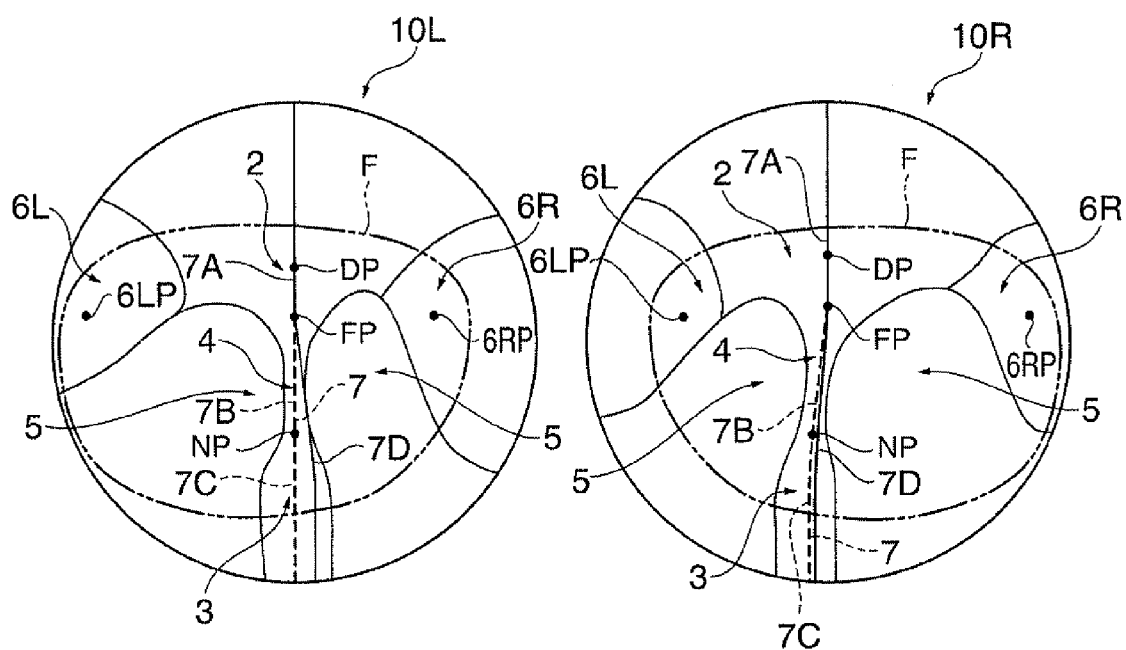
FIGS. 2A and 2B are schematic plan views of the progressive-power lenses according to the first embodiment, FIG. 2A corresponding to the left eye and FIG. 2B corresponding to the right eye.

FIGS. 2A and 2B are schematic plan views of the progressive-power lenses 10L and 10R used in the first embodiment. FIG. 2A shows the progressive-power lens 10L for the left eye, and FIG. 2B shows the progressive-power lens 10R for the right eye. Reference character F in FIGS. 2A and 2B denotes a frame.

In FIG. 2A, the progressive-power lens 10L for the left eye includes a far region 2 provided in an upper portion and used for far vision, a near region 3 provided in a lower portion and used for near vision, a progressive region 4 disposed in an intermediate position and having power continuously changing from the power in the far region 2 to the power in the near region 3, intermediate side regions 5 provided on both sides of the progressive region 4, and regions dedicated to mirrors 6L and 6R provided outside the intermediate side regions 5.

In FIG. 2B, the progressive-power lens 10R for the right eye has substantially the same configuration as that of the progressive-power lens 10L for the left eye and includes the far region 2, the near region 3, the progressive region 4, the intermediate side regions 5, and the mirror-dedicated regions 6L and 6R but differs from the progressive-power lens 10L for the left eye in terms of the size and position of each of the regions.

The far region 2, the near region 3, the progressive region 4, and the mirror-dedicated regions 6L and 6R are formed on the inner surface (eyeball side) or the outer surface (opposite to eyeball side) of the lens.

A principal meridian 7 is formed of a far line portion 7A passing through a distinct vision point DP, a progressive line portion 7B extending across the progressive region 4, and a near line portion 7C passing through another distinct vision point NP.

The far line portion 7A is so formed that it passes through the distinct vision point DP and extends along the vertical direction with reference to the spectacle wearer. The distinct vision point DP is located in a far dioptric power measurement region to which power is added in the far region 2.

The near line portion 7C is so formed that it passes through the distinct vision point NP and extends along the vertical direction with reference to the spectacle wearer. The distinct point NP is located in a near dioptric power measurement region to which power is added in the near region 3.

The progressive line portion 7B connects the lower end of the far line portion 7A to the upper end of the near line portion 7C and is inclined to the far line portion 7A and the near line portion 7C. Reference character 7D denotes a principal meridian in related art.

2. Configuration of Progressive-Power Lens Designing System

A description will next be made of a system for not only designing the progressive-power lenses 10L and 10R optimized for use in wearer's car driving but also ordering the designed lenses.

A progressive-power lens designing system 1 includes a manufacturer-side terminal 100 installed in a lens manufacturer and a plurality of shop-side terminals 200 installed in spectacle shops or other locations and connected to the manufacturer-side terminal 100 via the Internet 300, as shown in FIG. 3. In the progressive-power lens designing system 1, a variety of data measured in a spectacle shop or any other location is transmitted from the shop-side terminal 200 to the manufacturer-side terminal 100, which then uses the variety of received data to design a lens optimized for a specific work environment and transmits the results to the shop-side terminal 200. The shop-side terminal 200 can also place an order.

The Internet 300 is a network based on TCP/IP (Transmission Control Protocol/Internet Protocol) and other protocols, but the network used with the progressive-power lens designing system 1 is not limited to the Internet 300. For example, the Internet 300 can be replaced with a LAN (Local Area Network), a WAN (Wide Area Network), or any other intranet; a communication network and a broadcasting network formed of a plurality of base stations capable of transmitting and receiving information via a wireless medium; even a wireless medium itself for directly receiving data; or any other configuration that transmits and receives data.

2-1. Configuration of Manufacturer-Side Terminal

Figure 4:
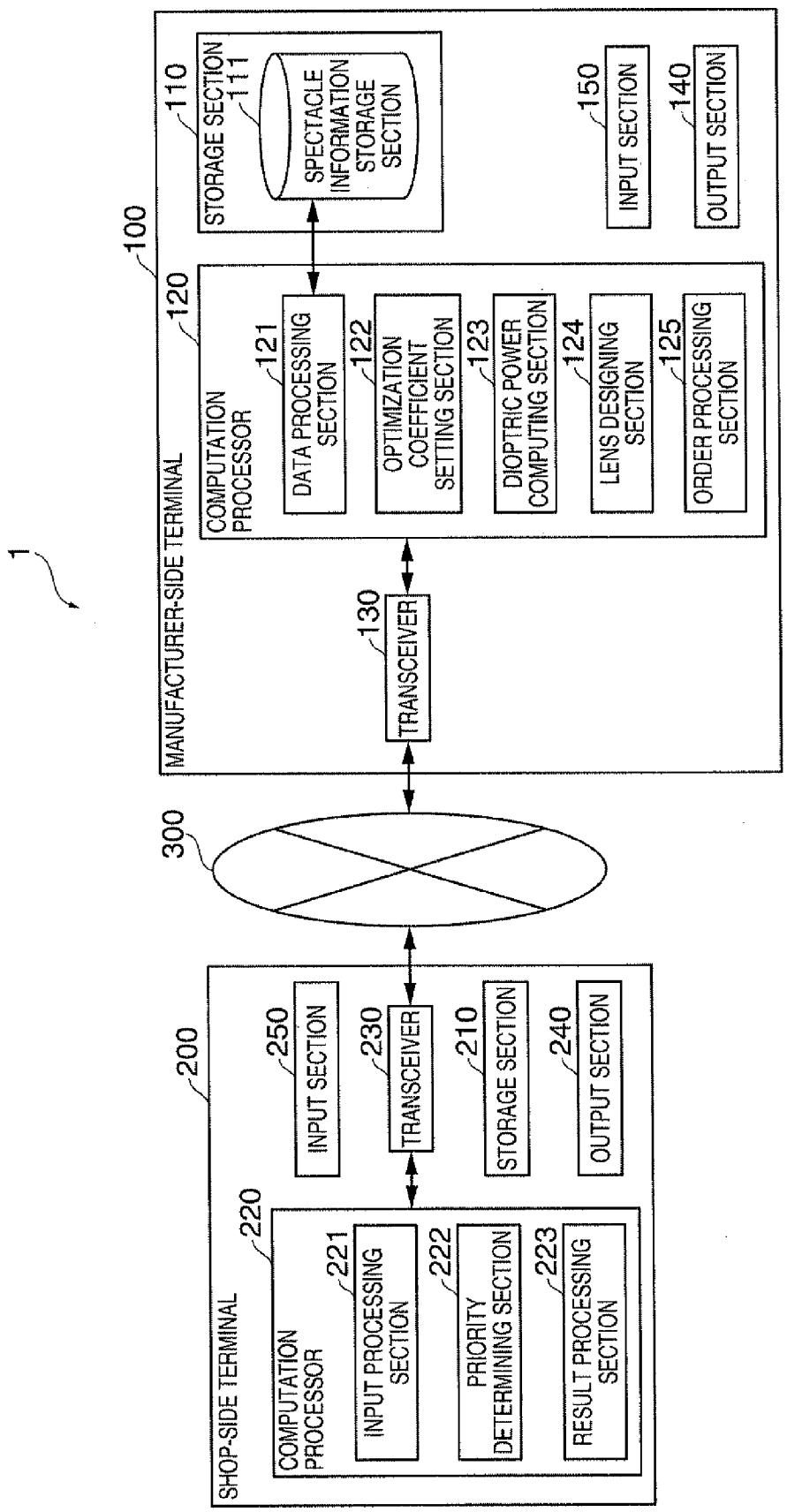
FIG. 4 is a block diagram showing an overall configuration of the progressive-power lens designing system according to the first embodiment.

The manufacturer-side terminal 100 includes a storage section 110 that stores a variety of data, a computation processor 120, a transceiver 130, an output section 140 that outputs a variety of screens, such as a display, and an input section 150, such as a keyboard, as shown in FIG. 4. The manufacturer-side terminal 100 is connected to the shop-side terminals 200 via a network. The manufacturer-side terminal 100 can, for example be a personal computer.

The storage section 110 includes a spectacle information storage section 111 that stores a variety of data received from a shop-side terminal 200. Although not shown, the storage section 110 further includes a storage section that stores programs that instruct the computation processor, which will be described later, to execute a variety of computations.

The spectacle information storage section 111 stores information on a customer, basic information on a spectacle lens (prescription data on a lens, frame data, fitting data, and other data), and information on a work environment. The spectacle information storage section 111 relates these pieces of information to one another and stores them as a single record. The information on a customer includes the name, age, sex of the customer and the name of the shop where the customer has given his or her information. The basic information on a spectacle lens includes lens prescription data, such as prescribed far dioptric power, spherical dioptric power, astigmatic dioptric power, a cylinder axis, prismatic dioptric power, a base setting, prescribed addition diopter (hereinafter sometimes also referred to as ADD), and a far interpupillary distance; frame data, such as the name of the manufacture of a frame selected by the customer, the type of the frame, the lens portion width of the frame, the nasal breadth of the frame, and the vertical width of the frame; and fitting data, such as the height of a far eyepoint, the vertex distance, and the pantoscopic angle of the frame selected by the customer. The information on a work environment includes the name of each target object, the direction of and distance to each target object, and priorities among target objects.

The computation processor 120 is a central processing unit (CPU) that computes and processes information and controls the entire manufacturer-side terminal 100. The computation processor cooperates with the hardware described above (storage section 110, output section 140, and input section 150) to achieve a variety of functions by reading and executing a variety of programs stored in the storage section 110 as appropriate.

The computation processor 120 includes a data processing section 121 that processes a variety of data received from a shop-side terminal 200, an optimization coefficient setting section 122 that sets an optimization coefficient for each target object in specific work, a dioptric power computing section 123 that computes dioptric power necessary to view each target object (hereinafter also referred to as target dioptric power), a lens designing section 124 that designs a lens, and an order processing section 125 that performs order processing when receiving an order from a shop-side terminal 200, as shown in FIG. 4.

The data processing section 121 stores information received by the transceiver 130 from a shop-side terminal 200 in the spectacle information storage section 111. The data processing section 121 acquires information necessary for processing in later stages, which will be described later, from the spectacle information storage section 111.

The optimization coefficient setting section 122 sets an optimization coefficient for each target object in a specific work environment. The optimization coefficient is an index representing which optimization is appropriate to view each target object through a progressive-power lens, aberration-oriented optimization or dioptric power error-oriented optimization. In a progressive-power lens, aberrations and a dioptric power error cannot be completely optimized at the same time. A typical progressive-power lens is therefore so designed that aberrations and a dioptric power error are balanced at the two distinct vision points in the far and near regions. On the other hand, it is necessary to optimize a dioptric power error, for example, when the wearer fixes his or her eyes on characters or symbols not through any of the two distinct vision points but through a quasi-distinct vision point. When there are no characters or symbols, however, aberrations are optimized because visibility is not improved by optimizing a dioptric power error. The optimization coefficient is therefore set in accordance with the characteristics of a target object. In the present embodiment, among the characteristics of a target object, the magnitude of change in the distance to the target object is used, and the optimization coefficient is set based on the distance to the target object and the magnitude of change in the distance. Specific values of the optimization coefficient range from 0 to 1. An optimization coefficient of 0 means that aberration-oriented optimization is performed, whereas an optimization coefficient of 1 means that dioptric power error-oriented optimization is performed. An optimization coefficient of 0.5 means that the optimization is performed with aberrations and a dioptric power error balanced.

The optimization coefficient is set based on Table 1 shown below. According to Table 1, when the distance to an object greatly changes, aberration-oriented optimization is performed because optimizing a dioptric power error does not greatly make sense. When the distance to an object does not greatly change and corresponds to far and intermediate vision, the optimization is performed with aberrations and a dioptric power error balanced. When the distance to an object does not greatly change and corresponds to near vision, dioptric power error-oriented optimization is performed. The reason for this is that a target object the distance to which corresponds to near vision is magnified at a higher magnification than a far target object and the resolution can be ensured at a satisfactory level even when a certain amount of aberration is induced. Dioptric power error-oriented optimization is therefore performed in order to reduce the amount of eye accommodation.

It is noted that a case where the distance to an object greatly change corresponds, for example, to an image formed on a side-view mirror during car driving. The driver views an image formed on the side-view mirror during car driving. Since the image is always moving, the distance to the image greatly changes.

TABLE 1

| Change in distance to object | Distance to object | Optimization coefficient |
| --- | --- | --- |
| large | — | 0 (aberration-oriented) |
| small | far | 0.5 (balanced) |
| small | intermediate | 0.5 (balanced) |
| small | near | 1 (dioptric power error-oriented) |

Based on Table 1, the optimization coefficient in a work environment of car driving in the present embodiment is set as shown in Table 2 below. That is, aberration-oriented optimization is performed for scenery viewed during car driving because the distance to scenery greatly changes. On the other hand, dioptric power error-oriented optimization is performed for an on-vehicle indicator because the distance to the indicator does not greatly change and the distance itself is small, so is for a car navigation system. On the other hand, when the driver fixes his or her eyes on a rearview mirror and a side-view mirror, the driver views images formed on the mirrors. Since the distances to images formed on the rearview mirror and the side-view mirror greatly change, aberration-oriented optimization is performed.

TABLE 2

| Target object | Change in distance to object | Distance to object | Optimization coefficient |
| --- | --- | --- | --- |
| scenery | large | — | 0 (aberration-oriented) |
| on-vehicle indicator | small | near | 1 (dioptric power error-oriented) |
| car navigation system | small | near | 1 (dioptric power error-oriented) |
| rearview mirror | large | — | 0 (aberration-oriented) |
| side-view mirror | large | — | 0 (aberration-oriented) |

The dioptric power computing section 123 sets the positions of the distinct vision points and quasi-distinct vision points in a specific work environment and computes target dioptric power at each of the quasi-distinct vision points.

To set the positions of the distinct vision points, the position of the distinct vision point DP adjusted to far vision and the position of the distinct vision point NP adjusted to the distance to and the direction of the on-vehicle indicator VM are first set. The principal meridian 7 that connects the distinct vision point DP to the distinct vision point NP is then set. Further, the far region 2 and the near region 3 are so set that they contain the respective distinct vision points.

Figure 5:
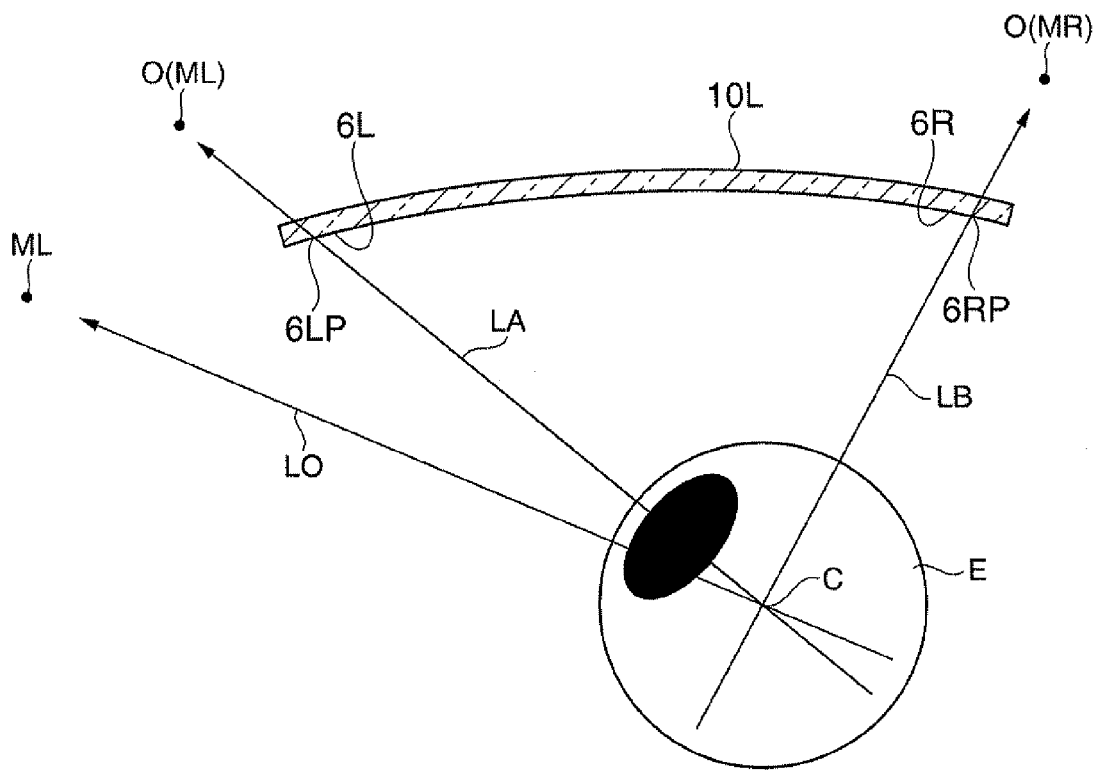
FIG. 5 is a schematic view for describing a range across which the line of sight moves.

A description will next be made of how to set quasi-distinct vision points 6LP and 6RP dedicated to mirrors with reference to FIGS. 5 to 7. FIG. 5 describes a range across which the line of sight moves.

In FIG. 5, when the lens wearer attempts to direct the line of sight toward the left side-view mirror ML as a target object O with the his or her head fixed, the line of sight follows a line LO outside the left end of the progressive-power lens 10L.

In the first embodiment, it is assumed that the wearer turns his or her head horizontally to view the left side-view mirror ML as a third target object O. The position through which a line LA passes is then set as the horizontal position of the mirror-dedicated quasi-distinct vision point 6LP. It is similarly assumed that the wearer turns his or her head horizontally to view the right side-view mirror MR as the third target object O. The position through which a line LB passes is then set as the horizontal position of the mirror-dedicated quasi-distinct vision point 6RP.

Figure 6:
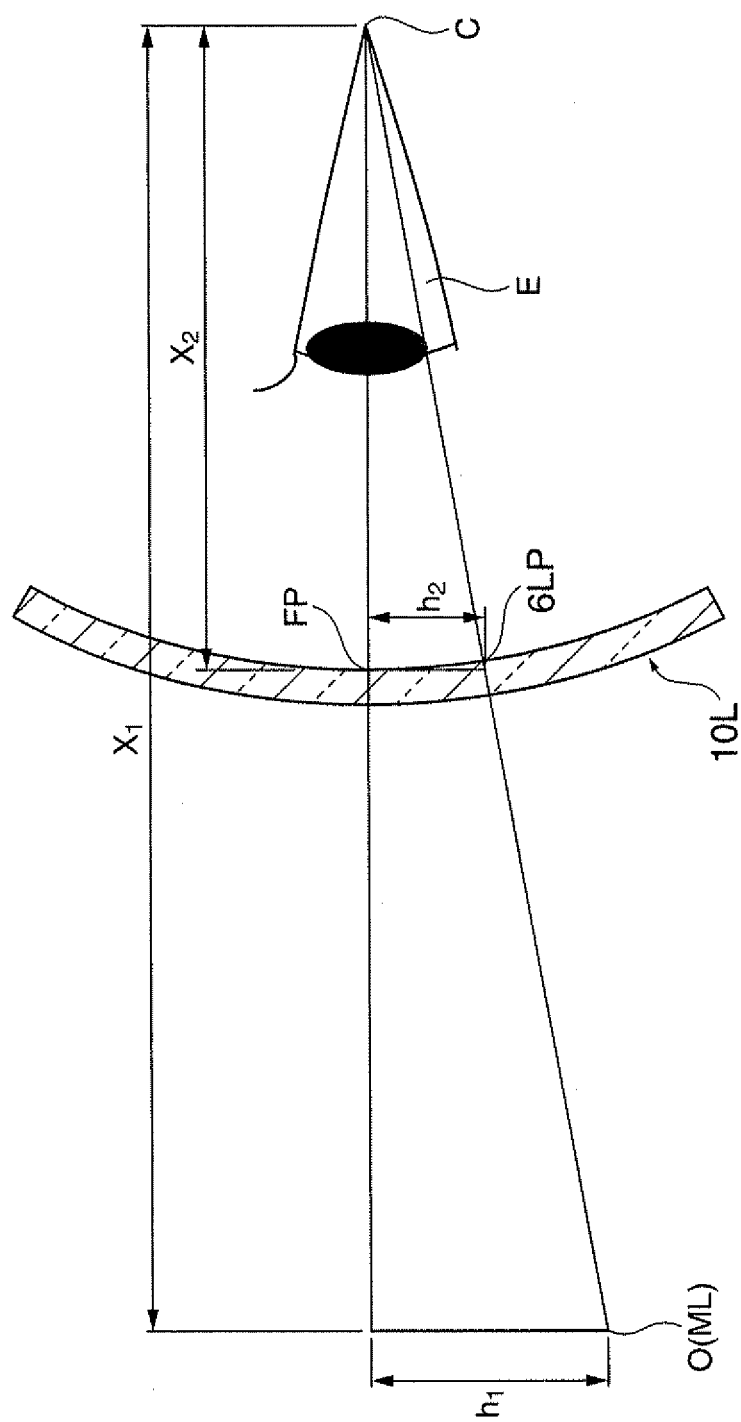
FIG. 6 is a schematic view for describing the height position of the line of sight.

FIG. 6 describes the height position of the line of sight. The vertical coordinate h2 of the mirror-dedicated quasi-distinct vision point 6LP can be determined by calculating the ratio of the height h1 from a fitting point FP to the third target object O to a horizontal distance X1 from the center C of an eyeball E to the target object O and multiplying the ratio by a horizontal distance X2 from the center C of the eyeball to the back surface of the lens.

The vertical coordinate h2 of the mirror-dedicated quasi-distinct vision point 6RP can be determined by calculating the ratio of the height h1 from the fitting point FP to the target object O to the horizontal distance X1 from the center C of the eyeball E to the target object O and multiplying the ratio by the horizontal distance X2 from the center C of the eyeball to the back surface of the lens.

Under the conditions described above, a description will be made of how to set the quasi-distinct vision points 6LP and 6RP in consideration of binocular vision with reference to FIG. 7. FIG. 7 describes the positions of the lines of sight in consideration of binocular vision.

Figure 7:
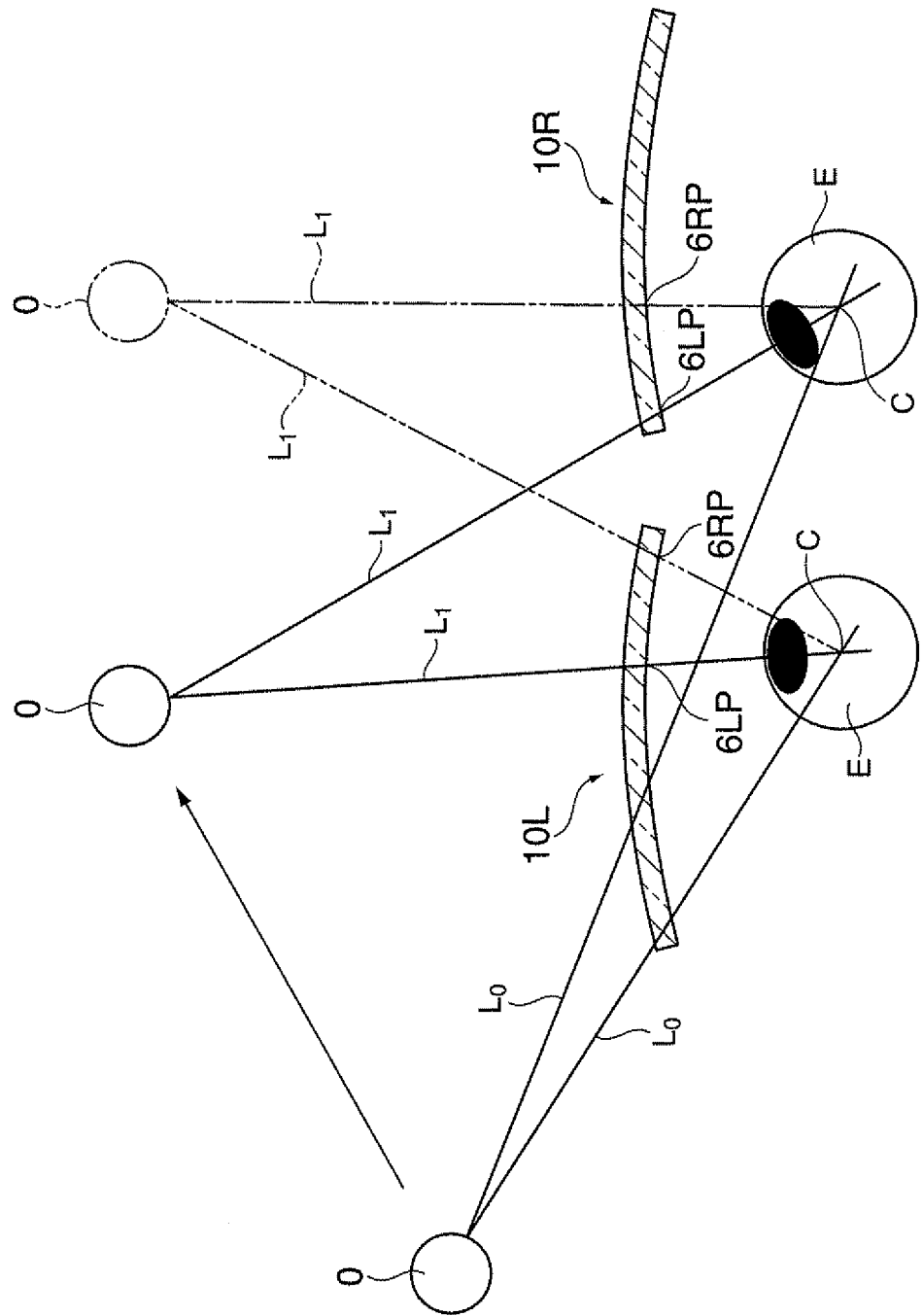
FIG. 7 is a schematic view for describing the positions of the lines of sight in consideration of binocular vision.

In FIG. 7, when the lens wearer views the third target object O without moving his or her head, the lines of sight L0 from both eyes do not pass through the progressive-power lenses 10L and 10R but pass points outside the left ends thereof. When the wearer so moves his or her head that the lines of sight L1 still pass through the progressive-power lenses 10L and 10R, particularly when the line of sight L1 from the right eye reaches a predetermined position in a left portion of the progressive-power lens 10R for the right eye, that point is set as the quasi-distinct vision point 6LP. Similarly, when the wearer so moves his or her head that the lines of sight L1 from both eyes still pass through the progressive-power lenses 10L and 10R, particular when the line of sight L1 from the left eye reaches a predetermined position in a right portion of the progressive-power lens 10L for left eye, that point is set as the quasi-distinct vision point 6RP.

The target dioptric power will next be described. The target dioptric power is accommodation power necessary at a distinct vision point and a quasi-distinct vision point of a progressive-power lens and calculated, for example, from the following Equation (1) based on customer's prescription data.

$$\text{target dioptric power}=Df+k/L \tag{1}$$

In the equation, Df represents customer's prescribed far dioptric power (D: diopter), and L represents the distance (m) between the lens and a target object. For astigmatic prescription, Equation (1) is applied to each principal meridian. In the equation, k represents the proportion of the accommodation power for which the progressive-power lens is responsible when the wearer of the progressive-power lens views a target object. The value of k is determined based on prescribed addition diopter ADD of a typical progressive-power lens and calculated from the following Equation (2).

$$K=ADD \times Ln \tag{2}$$

In the equation, Ln represents a near working distance for the prescribed addition diopter. In the method described above, optimum dioptric power that allows the wearer to view a target object at an intermediate distance can be readily calculated as long as the prescribed addition ADD of the progressive-power lens is available.

The lens designing section 124 designs a progressive-power lens based on the variety of pieces of information received from the shop-side terminal 200, the optimization coefficient, the positions of the distinct vision points and the quasi-distinct vision points, and the target dioptric power.

Refracting power that allows the wearer to distinctly view a target object is added to each of the distinct vision points DP and NP, which have been set in the dioptric power computing section 123, in the far region 2 and the near region 3. Thereafter, based on the quasi-distinct vision point 6LP and 6RP, the positions of which have been determined by the dioptric power computing section 123, optimum average dioptric power (refracting power) at each of the quasi-distinct vision points 6LP and 6RP is added by changing an aspheric surface (aspheric coefficients of rotationally symmetric aspheric surface) disposed at an end of the corresponding intermediate side region 5. The mirror-dedicated regions 6L and 6R are then set by optimizing the amount of astigmatism.

The average dioptric power (refracting power) at the quasi-distinct vision points 6LP and 6RP is optimized in accordance with the distances to the side-view mirrors ML and MR, each of which is the target object O. That is, the optimization at the quasi-distinct vision points 6LP and 6RP is performed based on the optimization coefficient and the target dioptric power. When the optimization coefficient is 1, the optimization is so performed that aberrations approach zero. As a result, an error in the target dioptric power may increase and may be left as it is. On the other hand, when the optimization coefficient is 0, the optimization is so performed that the dioptric power approaches the target dioptric power (dioptric power error approaches 0). As a result, aberrations may increase and may be left as they are. Further, when the optimization coefficient is 0.5, the optimization is so performed that aberrations and a dioptric power error are balanced.

The order processing section 125 performs order processing when the transceiver 130 receives an order placed by a shop-side terminal 200. In the order processing, for example, the order may be transmitted to another terminal (not shown) and the order processing may be performed by that terminal. Further, that terminal may issue an instruction to manufacture the progressive-power lens and manage delivery thereof.

The transceiver 130 transmits and receives a variety of data through communication with a shop-side terminal 200.

The output section 140 is not particularly limited to a specific component but may be any component that can display data on a designed lens, such as a display and a printer.

The input section 150 may be any component to which a variety of data can be inputted, such as a keyboard and a mouse.

2-2. Configuration of Shop-Side Terminal

Each of the shop-side terminals 200 includes a storage section 210 that stores a variety of data, a computation processor 220 that performs a variety of computations, a transceiver 230, an output section 240 that outputs a variety of screens, such as a display, and an input section 250, such as a keyboard, and is connected to the manufacturer-side terminal 100 via a network, as shown in FIG. 4. Each of the shop-side terminals 200 can, for example, be a personal computer.

The storage section 210 stores a variety of inputted data, result data received from the manufacturer-side terminal, and other data. The storage section 210 further stores programs containing codes of a process of prompting an operator to input a variety of data on a spectacle lens and transmitting them to the manufacturer-side terminal 100, a process of displaying result data received from the manufacturer-side terminal 100, and a process of determining priorities among target objects in a specific work environment. The storage section 210 further stores a variety of forms used to display the screens.

The computation processor 220 is a central processing unit (CPU) that computes and processes information and controls the entire shop-side terminal 200. The computation processor 220 cooperates with the hardware described above (storage section 210, output section 240, and input section 250) to achieve a variety of functions by reading and executing a variety of programs stored in the storage section 210 as appropriate.

The computation processor 220 includes an input processing section 221 that prompts an operator to input information on a spectacle lens, a priority determining section 222 that determines priorities among target objects in a specific work environment, and a result processing section 223 that outputs result data received from the manufacturer-side terminal 100.

The input processing section 221 creates an input screen that prompts an operator to input a variety of data, displays the input screen on the output section 240, such as a display, and transmits data inputted through the input screen to the manufacturer-side terminal 100 via the transceiver 230.

Information to be inputted includes data necessary to design a lens, a work environment in which the spectacle lens is used, and image data produced by a sight line direction measurement apparatus.

The data necessary to design a lens may include prescription data on the lens, frame data, and fitting data. In particular, prescribed far dioptric power in the prescription data on the lens, the frame shape, and other information are important.

The work environment in which the spectacle lens is used includes car driving and personal computer operation. The information on the work environment further includes a target object on which the wearer fixes his or her eyes in the work environment, the distance to the target object, the direction of the target object, and other information.

Figure 8:
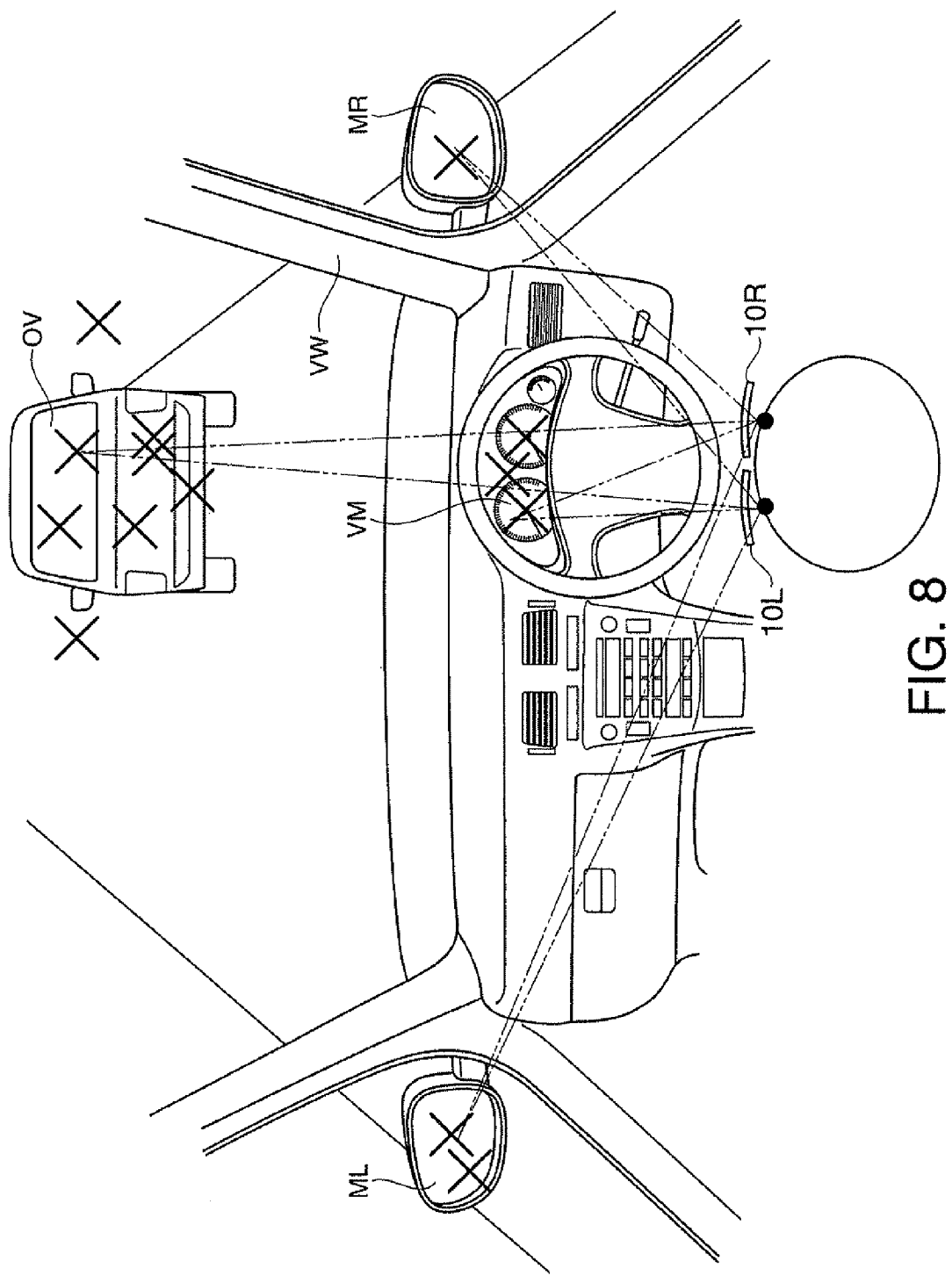
FIG. 8 describes a method for automatically determining priorities among target objects in the first embodiment.

Image data produced by a sight line direction measurement apparatus is used when the priority determining section 222 determines the priorities among target objects on which the wearer who is driving a car fixes his or her eyes. The sight line direction measurement apparatus quantitatively measures an area on which the wearer fixes his or her eyes and is typically called an eye mark recorder. The eye mark recorder can, for example, be "EMR-9 (trade name)" manufactured by Nac Image Technology, Inc. A customer wears the eye mark recorder, drives a car, and marks a point of fixation at predetermined intervals to measure the frequency at which the customer fixes his or her eyes on a target object. FIG. 8 shows an image produced by the eye mark recorder described above. In FIG. 8, the vehicle OV running in front of the car driven by the wearer, the on-vehicle indicator VM, the left side-view mirror ML, and the right side-view mirror MR are labeled with an "X" mark, and FIG. 8 demonstrates that the wearer has fixed his or her eyes on these target objects.

The priority determining section 222 extracts target objects and determines the priorities among the extracted target objects based on the inputted image data produced by the eye mark meter. That is, the priority determining section 222 extracts target objects labeled with the "X" mark in the image shown in FIG. 8 and determines the priorities based on the number of "X" marks. Since a higher priority is given to a target object that the driver views more frequently, the priorities among the target objects in the image data shown in FIG. 8 are as follows in descending order of priority: the vehicle OV running in front of the car driven by the wearer, the on-vehicle indicator VM, the left side-view mirror ML, and the right side-view mirror MR.

The result processing section 223 creates a result screen on which result data received by the transceiver 230 is displayed and displays the result screen on the output section 240, such as a display.

The transceiver 230 transmits input information inputted from the input section 250 through communication with the manufacturer-side terminal 100 to the manufacturer-side terminal 100 and receives result data transmitted from the manufacturer-side terminal 100.

The output section 240 is not particularly limited to a specific component but may be any component that can display data on a designed lens, such as a display and a printer.

The input section 250 may be any component to which a variety of data can be inputted, such as keyboard and a mouse.

3. Action of Progressive-Power Lens Designing System

Figure 9:
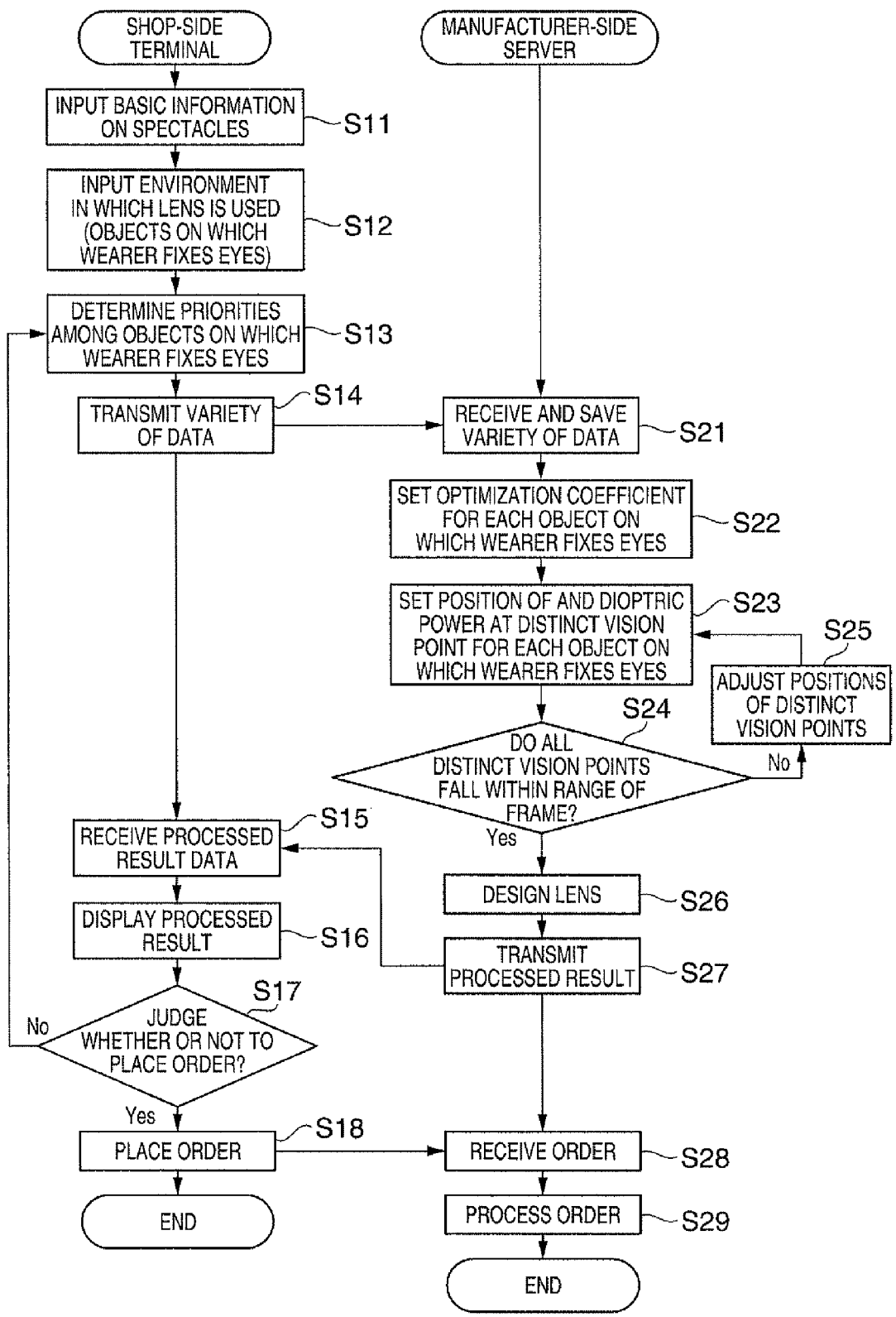
FIG. 9 is a flowchart showing the action of the progressive-power lens designing system according to the first embodiment.

The action of the progressive-power lens designing system 1 will next be described with reference to the flowchart of FIG. 9.

3.1 Measurement Method Using Eye Mark Recorder

Before operating the progressive-power lens designing system 1, a shop attendant in a shop carries out measurement by using an eye mark recorder in a specific work environment for an individual customer.

In the present embodiment, the measurement is carried out in the work environment of car driving shown in FIG. 1. Specifically, a customer who wears an eye mask recorder drives a car, and the direction of the line of sight is measured at one-second intervals for 15 seconds. The measurement period and other parameters are not limited to the values described above but can be changed as appropriate. FIG. 8 shows a measurement result. In FIG. 8, objects with many "X" marks are target objects, and the priorities among the target objects are determined based on the number of "X" marks. That is, the priorities among the target objects are as follows in descending order of priority: the vehicle OV running in front of the car driven by the wearer, the on-vehicle indicator VM, the left side-view mirror ML, and the right side-view mirror MR.

3-2. Action of Progressive-Power Lens Designing System

When the measurement using the eye mark recorder is completed, the shop attendant in the shop operates the input section 250 of the shop-side terminal 200 to instruct the output section 240 to display the input screen, to which a variety of data is inputted, and inputs necessary information.

As first items to be inputted, the following items can be inputted: customer information, such as the name, age, and sex of the customer and the name of the shop where the customer is giving the information; and basic information, such as prescription data on a lens including prescribed far dioptric power, frame data, and fitting data. The shop attendant follows instructions displayed on the input screen and inputs the information (S11).

The shop attendant then inputs an environment in which the spectacle lens for the customer is used (S12). The environment in which the spectacle lens of the present embodiment is used is car driving, and the shop attendant inputs image data produced by the eye mark recorder, the name of each target object, the direction of and the distance to the target object.

The priority determining section 222 analyses the inputted image data produced by the eye mark recorder to determine the priorities among the target objects in the image data (S13). The priorities in FIG. 8 are as follows in descending order of priority: the vehicle OV running in front of the car driven by the wearer, the on-vehicle indicator VM, the left side-view mirror ML, and the right side-view mirror MR.

The input processor 221 then transmits the customer information, the basic information, and the information on the work environment (target objects, directions of and distances to target objects, and priorities among target objects) inputted in S11 to the manufacturer-side terminal 100 via the transceiver 230 (S14).

In the manufacturer-side terminal 100, when the transceiver 130 receives the variety of data, the data processing section 121 stores the variety of data in the spectacle information storage section 111 on a customer basis (S21).

The optimization coefficient setting section 122 then determines an optimization coefficient for each of the target objects based on the data on the work environment (S22).

Although determined as described above, the vehicle OV running in front of the car driven by the wearer, the on-vehicle indicator VM, the left side-view mirror ML, and the right side-view mirror MR, which are the target objects in the present embodiment, will be specifically described below. To design a progressive-power lens for viewing the four target objects, the design is performed for the two target objects having higher priorities in the same manner as in related art. The description will therefore be made of setting optimization coefficients for the remaining two target objects having third and fourth priorities, that is, the left side-view mirror ML and the right side-view mirror MR. Since Tables 1 and 2 show that optimization coefficients for the left side-view mirror ML and the right side-view mirror MR are zero, aberration-oriented optimization will be performed.

The dioptric power computing section 123 sets the positions of distinct vision points and quasi-distinct vision points on the lens and computes the target dioptric power at each of the distinct vision points (S23). The positions are set as follows: The on-lens position of the line of sight from the wearer who is viewing the vehicle OV running in front of the vehicle driven by the wearer is the distinct vision point DP; the on-lens position of the line of sight from the wearer who is viewing the on-vehicle indicator VM is the distinct vision point NP; and the on-lens positions of the lines of sight from the wearer who is viewing the left side-view mirror ML and the right side-view mirror MR are the quasi-distinct vision points 6LP and 6RP.

Specifically, the positions of the distinct vision points and the quasi-distinct vision points for the target objects are set on the lens surface based on the directions of the target objects, as described above. Further, the target dioptric power at each of the quasi-distinct vision points is calculated based on the prescribed far dioptric power and the distance to the corresponding target object. For example, when the prescribed far dioptric power S is 0.00 D; the prescribed addition diopter ADD is 2.00 D; the near working distance Ln for the prescribed addition diopter is 30 cm; and the distance to the left side-view mirror ML is 140 cm, the target dioptric power can be calculated from Equations (1) and (2) as follows.

$$\text{target dioptric power} = 0.00 + 2.00 \times 0.30/1.40 = 0.43 \tag{D}$$

The lens designing section 124 then judges whether or not the positions of the distinct vision points and the quasi-distinct vision points set in S23 fall within the range of the frame based on the frame data on the frame selected by the customer (S24).

When all the positions of the distinct vision points and the quasi-distinct vision points do not fall within the region of the frame, the positions of the distinct vision points and the quasi-distinct vision points are so adjusted that they fall within the range of the frame (S25). The control then returns to S23, and the dioptric power computing section 123 calculates the target dioptric power again.

On the other hand, when all the positions of the distinct vision points and the quasi-distinct vision points fall within the range of the frame, the lens designing section 124 performs lens design based on the basic information on the spectacle lens for the customer and the optimization coefficient and the target dioptric power for each of the target objects (S26).

Specifically, refracting power is first added to each of the distinct vision points DP and NP in such a way that the refracting power allows the wearer to distinctly view the corresponding target object located at the distance thereto, as described above. Thereafter, optimum average dioptric power (refracting power) is added to each of the quasi-distinct vision points 6LP and 6RP by changing an aspheric surface (aspheric coefficients of rotationally symmetric aspheric surface) disposed at an end of the corresponding intermediate side region 5. The mirror-dedicated regions 6L and 6R are then set by optimizing the amount of astigmatism. The optimization is performed based on the target dioptric power and the optimization coefficient at each of the quasi-distinct vision points 6LP and 6RP. In the present embodiment, although the target dioptric power for the left side-view mirror ML is +0.43 (D), the optimization is so performed that aberrations approach zero because the optimization coefficient is zero.

The lens designing section 124 then transmits result data on the designed lens to the shop-side terminal 200 via the transceiver 130 (S27).

In the shop-side terminal 200, when the transceiver 230 receives the result data (S15), the result processing section 223 creates a result screen and the output section 240 displays the result data on the result screen (S16).

The shop attendant or the customer looks at the result screen, checks the result data on the designed lens, and judges whether or not to place an order for the lens (S17).

When it is judged that no order for the lens is placed, the system may then be terminated, or the control may return to S13 and new information on the work environment may be inputted again. In this case, the manufacturer-side terminal 100 redesigns a lens based on the new data.

When it is judged that an order for the lens is placed, an order placement button (not shown) displayed on the result screen is pressed. The result processing section 223 then transmits order placement data to the manufacturer-side terminal 100 via the transceiver 230 (S18).

In the manufacturer-side terminal 100, the transceiver 130 receives the order placement data (S28) and the order processing section 125 processes the order (S29).

4. Examples

Specific Example 1 of the progressive-power lenses 10L and 10R of the first embodiment will next be described with reference to FIGS. 10A to 13B.

In Example 1, it was assumed that the distance between the front of the spectacle wearer's head and the on-vehicle indicator VM was 60 cm; the distance between the front of the spectacle wearer's head and the right side-view mirror MR was 80 cm; and the distance between the front of the spectacle wearer's head and the left side-view mirror ML was 140 cm. The progressive-power lenses 10L and 10R of Example 1 were designed under the conditions described above.

FIGS. 10A and 10B are astigmatism diagrams in Example 1, and FIGS. 11A and 11B are astigmatism diagrams in related art in which no mirror-dedicated quasi-distinct vision point is present.

Comparison between the astigmatism diagrams of FIGS. 10A and 11A for the left-eye progressive-power lenses shows no great difference in astigmatism at the distinct vision point DP between Example 1 and the related art, but shifting the position of the distinct vision point NP in Example 1 leftward from a distinct vision point NP' in the related art by 2.5 mm allows the wearer to distinctly view the indicator because the line of sight toward the indicator passes through the center of the near region 3. It is assumed in Example 1 that astigmatism smaller than or equal to 0.5 D is accepted.

On the other hand, there is a large difference in astigmatism between the mirror-dedicated quasi-distinct vision points 6LP, 6RP in Example 1 and points 6Lo, 6Ro in the related art, which correspond to the mirror-dedicated quasi-distinct vision points 6LP and 6RP. That is, only a small amount of astigmatism is produced at the mirror-dedicated quasi-distinct vision points 6LP and 6RP in Example 1 and hence the spectacle wearer does not suffer from blurring, whereas a large amount of astigmatism is produced at the points 6Lo and 6Ro in the related art and hence the spectacle wearer suffers from blurring.

Comparison between the astigmatism diagrams of FIGS. 10B and 11B for the right-eye progressive-power lenses shows no great difference in astigmatism at the distinct vision point DP between Example 1 and the related art as in the case of the left-eye progressive-power lenses, but there is a large difference in astigmatism between the mirror-dedicated quasi-distinct vision points 6LP and 6RP in Example 1 and the points 6Lo and 6Ro in the related art.

Comparison between the mirror-dedicated quasi-distinct vision point 6LP in Example 1 and the point 6Lo in the related art in terms of astigmatism shows that the amount of astigmatism is 0.3 D in Example 1, whereas the amount of astigmatism is 1.8 D in the related art. It can therefore be concluded that 0.3 D in Example 1 is closer to the target value of 0 D. That is, Example 1 excels the related art in the amount of astigmatism by approximately 80%.

Figures 12A, 12B:
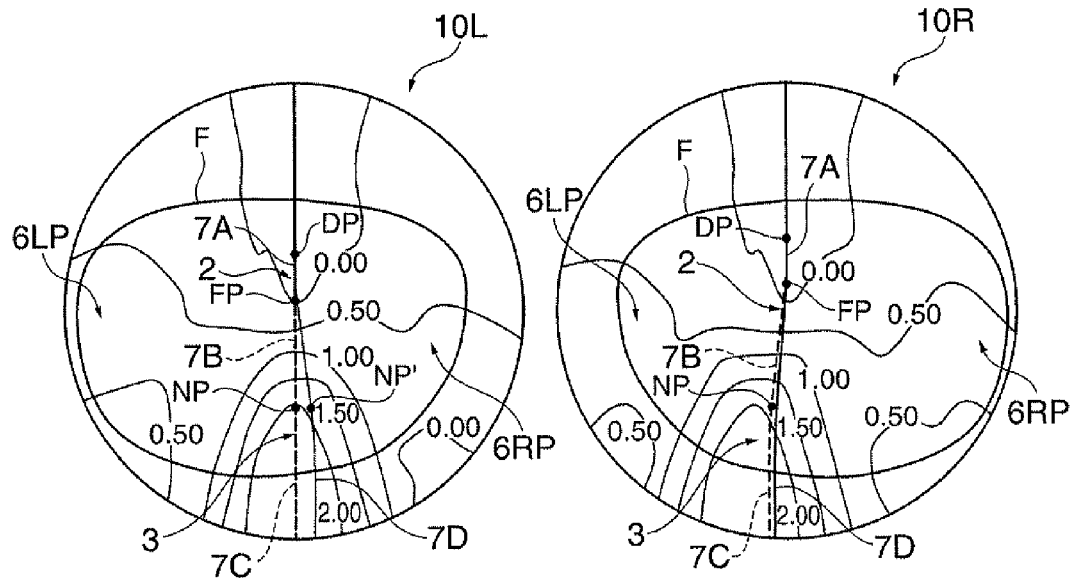
FIGS. 12A and 12B are average dioptric power distribution diagrams in Example 1, FIG. 12A corresponding to the left eye and FIG. 12B corresponding to the right eye.
Figures 13A, 13B:
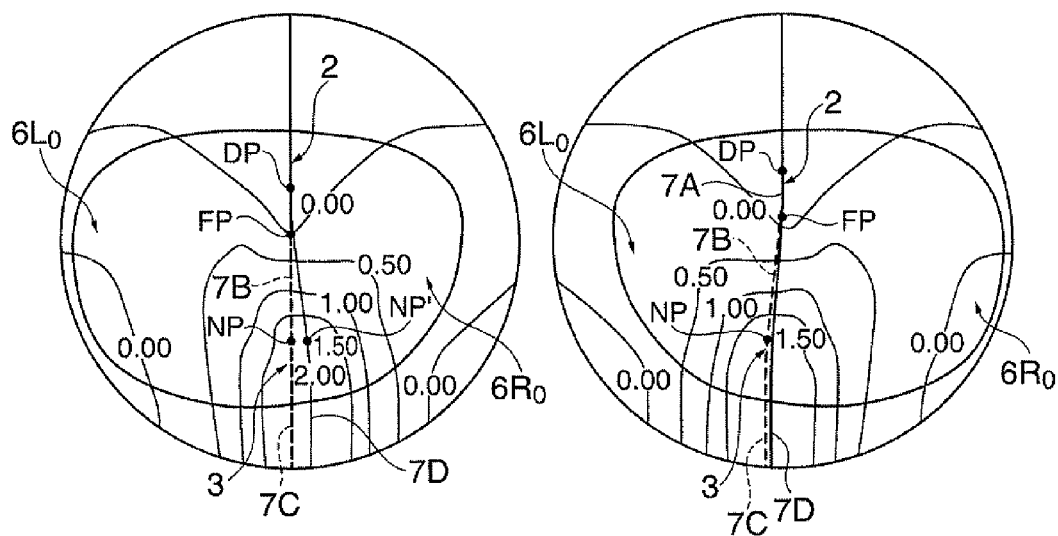
FIGS. 13A and 13B are average dioptric power distribution diagrams in the related art, FIG. 13A corresponding to the left eye and FIG. 13B corresponding to the right eye.

FIGS. 12A and 12B are average dioptric power distribution diagrams in Example 1, and FIGS. 13A and 13B are average dioptric power distribution diagrams in the related art. FIGS. 12A and 13A correspond to the left eye, and FIGS. 12B and 13B correspond to the right eye. Comparison between the average dioptric power distribution diagrams of FIGS. 12A and 13A for the left-eye progressive-power lenses shows no great difference in average dioptric power at the distinct vision point DP between Example 1 and the related art, but shifting the position of the distinct vision point NP in Example 1 leftward from the distinct vision point NP' in the related art by 2.5 mm so that the shifted NP coincides with the line of sight toward the indicator allows the wearer to distinctly view the indicator through the center of the near region 3. Comparison between the average dioptric power distribution diagrams of FIGS. 12B and 13B for the right-eye progressive-power lenses shows the same result as that for the left eye progressive-power lenses.

5. Advantageous Effects in First Embodiment

The first embodiment can therefore provide the following advantageous effects.

(1) Priorities among target objects are determined based on the frequencies at which the wearer fixes his or her eyes on the target objects and which are measured by an eye mark recorder, and a higher priority is given to a target object having a higher eye-fixing frequency. Further, the on-lens position of the line of sight originating from the wearer who is viewing a target object and having third or lower priority is set as a quasi-distinct vision point. Thereafter, an optimization coefficient and target dioptric power at the thus set quasi-distinct vision point are determined, and lens design is performed by optimizing the lens based on the optimization coefficient and the target dioptric power. As a result, an optimum lens for viewing a specific target object in a specific work environment can be designed.

In particular, since the optimization coefficient is set based on the distance to each target object and the characteristics of the target object (the magnitude of change in the distance), the wearer can comfortably fix his or her eyes on the target objects through the quasi-distinct vision points 6LP and 6RP, through which the target object is viewed. Specifically, when an image formed on the left side-view mirror ML is of interest, aberration-oriented optimization is performed. The reason for this is that an image (of scenery) formed on the left side-view mirror ML greatly changes with distance, and hence the visibility is unlikely improved even by adjusting the dioptric power. As described above, since the optimization is performed in accordance with the characteristics of each target object, a progressive-power lens optimized for a specific work environment, car driving in the embodiment described above, can be provided.

(2) As described above, since the progressive-power lens designing system 1 can automatically perform optimization at quasi-distinct vision points, a progressive-power lens optimized for a specific work environment can be quickly and readily designed and ordered.

Since a spectacle shop can readily cooperate with a lens manufacturer, a spectacle lens can be smoothly ordered from a shop-side terminal 200, whereby a wide range of service can be provided to a customer.

(3) Further, in a spectacle shop where a shop-side terminal 200 is installed, the priorities among target objects are determined by measuring the direction of the line of sight in a specific work environment with an eye mark recorder on a customer basis. As a result, objects on which a customer fixes his or her eyes in a specific work environment and the frequencies at which the customer fixes his or her eyes on the objects can be identified, and lens design can be automatically performed based on the priorities among the objects. Specifically, since the distinct vision points DP and NP are set, and then the mirror-dedicated regions 6L and 6R are set by changing aspheric surfaces where blurring and distortion occur, the distinct vision points DP and NP can be set in the same manner as in related art, whereby the lens design is readily performed.

(4) A progressive-power lens designed by using the progressive-power lens designing system 1 includes the mirror-dedicated quasi-distinct vision points 6LP and 6RP, shifted from the two distinct vision points DP and NP, through which the wearer distinctly views a third target object and to each of which refracting power is added, whereby the amount of blurring due to the lens decreases when the wearer views the side-view mirror ML or MR and hence the wearer can drive a car comfortably.

(5) Further, since the refracting power added to the mirror-dedicated quasi-distinct vision points 6LP and 6RP is determined in accordance with the distances from the preset side-view mirrors ML and MR to the spectacle wearer, the progressive-power lenses 10L and 10R optimized for viewing the side-view mirrors ML and MR can be provided.

Second Embodiment

A second embodiment of the invention will next be described with reference to FIGS. 14, 15, 16, 17A, 17B, 18A, and 18B.

Figure 14:
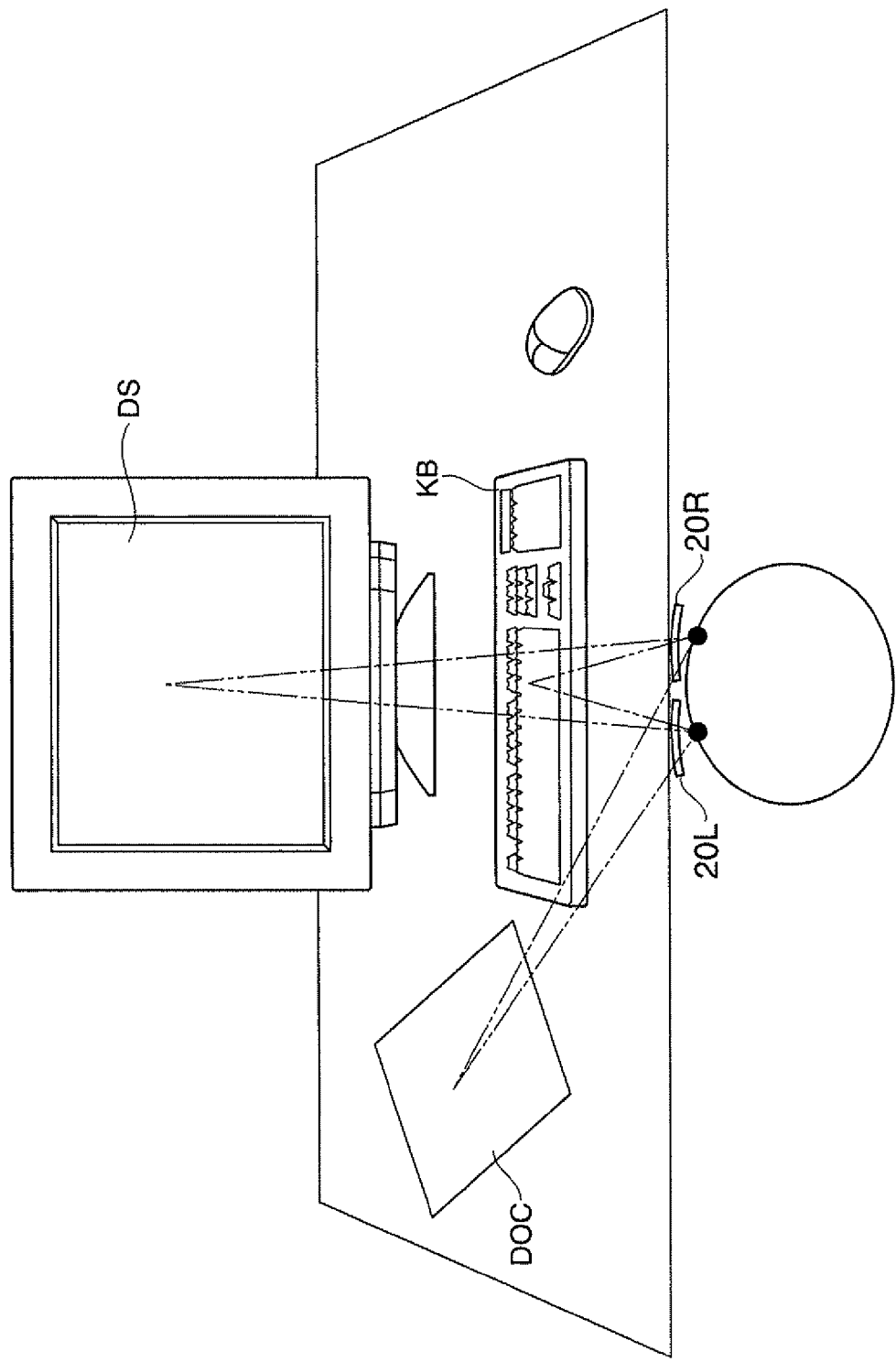
FIG. 14 is a schematic view showing a case where progressive-power lenses according to a second embodiment of the invention are used.

In the second embodiment, progressive-power lenses 20L and 20R are dedicated to operation of personal computer as shown in FIG. 14 and primarily used to distinctly view a display DS of the personal computer, a keyboard KB disposed in front of the display DS, and a document DOC disposed to the left of the keyboard KB.

1. Progressive-Power Lens

Figures 15A, 15B:
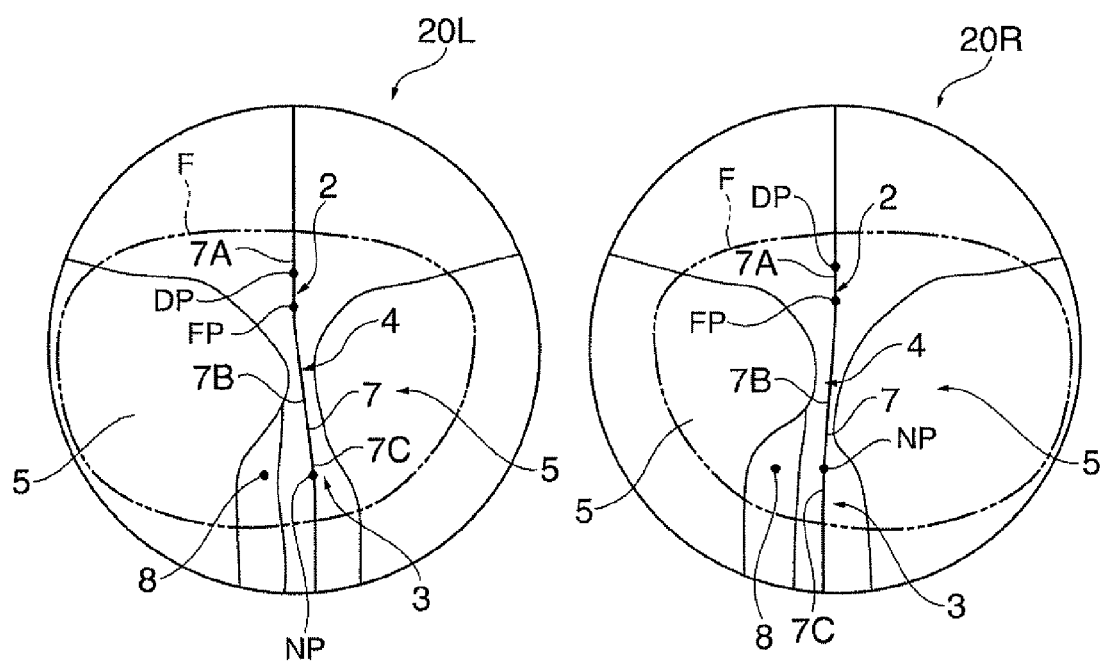
FIGS. 15A and 15B are schematic plan views of the progressive-power lenses according to the second embodiment, FIG. 15A corresponding to the left eye and FIG. 15B corresponding to the right eye.

FIGS. 15A and 15B are schematic plan views of the progressive-power lenses 20L and 20R. FIG. 15A shows the progressive-power lens 20L for the left eye, and FIG. 15B shows the progressive-power lens 20R for the right eye.

In FIG. 15A, the progressive-power lens 20L for the left eye includes a far region 2 having a distinct vision point DP, a near region 3 having a distinct vision point NP, a progressive region 4, intermediate side regions 5, and a quasi-distinct vision point 8 dedicated to documents and provided between the near region 3 and the left intermediate side region 5.

In FIG. 15B, the progressive-power lens 20R for the right eye includes a far region 2 having a distinct vision point DP, a near region 3 having a distinct vision point NP, a progressive region 4, intermediate side regions 5, and a quasi-distinct vision point 8 dedicated to documents in substantially the same manner as the progressive-power lens 20L for the left eye but differs therefrom in that the size of each of the regions is different.

The far region 2 having the distinct vision point DP, the near region 3 having the distinct vision point NP, the progressive region 4, and the document-dedicated quasi-distinct vision point 8 are formed on the inner surface (eyeball side) or the outer surface (opposite to eyeball side) of the lens.

In FIGS. 15A and 15B, the document-dedicated quasi-distinct vision point 8 is disposed to the left of the distinct vision point NP in order to allow the wearer to distinctly view the document DOC disposed to the left of the keyboard KB in FIG. 14 primarily in consideration of right hand operation of a mouse. Alternatively, in the present embodiment, the document-dedicated quasi-distinct vision point that allows the wearer to distinctly view the document DOC disposed to the right of the keyboard KB may be disposed to the right of the distinct vision point NP in consideration of left hand operation of a mouse.

Refracting power is added to each of the far region 2 and the near region 3 symmetrically with respect to the distinct vision points DP and NP, respectively, as in related art.

Optimum average dioptric power (refracting power) at the document-dedicated quasi-distinct vision point 8 is added by changing the size of a distinct vision region close to the distinct vision point NP in each of the intermediate side regions 5. The amount of astigmatism is thus optimized.

2. Configuration of Progressive-Power Lens Designing System

A progressive-power lens designing system in the second embodiment has the same configuration as that in the first embodiment. In the following section, specific description will be made with reference to a case where the optimization coefficient setting section 122 sets optimization coefficients in a work environment of desk work using the personal computer in the second embodiment.

The optimization coefficient setting section 122 sets optimization coefficients shown in Table 3 below based on Table 1 described above in the personal computer work environment in the second embodiment. That is, since change in distance to each target object is small in desk work, an optimization coefficient is set based on the distance itself. Since the distances to a notebook PC, a keyboard, and a document disposed close to the wearer are small, the optimization coefficients are set at one and dioptric power error-oriented optimization is performed. Since the distance to a room clock is large, optimization is performed with a dioptric power error and aberrations balanced. The distances to a desktop PC and a desktop calendar are intermediate, optimization is performed with a dioptric power error and aberrations balanced as well.

TABLE 3

| Target object | Change in distance to object | Distance to object | Optimization coefficient |
| --- | --- | --- | --- |
| desktop PC | Small | intermediate | 0.5 (balanced) |
| notebook PC | Small | near | 1 (dioptric power-oriented) |
| keyboard | Small | near | 1 (dioptric power-oriented) |
| room clock | Small | far | 0.5 (balanced) |
| desktop calendar | Small | intermediate | 0.5 (balanced) |
| document disposed close to the wearer | small | near | 1 (dioptric power-oriented) |

3. Action of Progressive-Power Lens Designing System

The action of the progressive-power lens designing system 1 in the second embodiment will next be described with reference to the flowchart shown in FIG. 9, but the same actions as those in the first embodiment will not be described.

3-1. Measurement Method Using Eye Mark Recorder

Before operating the progressive-power lens designing system 1, a shop attendant in a shop carries out measurement by using an eye mark recorder in a specific work environment for an individual customer.

Figure 16:
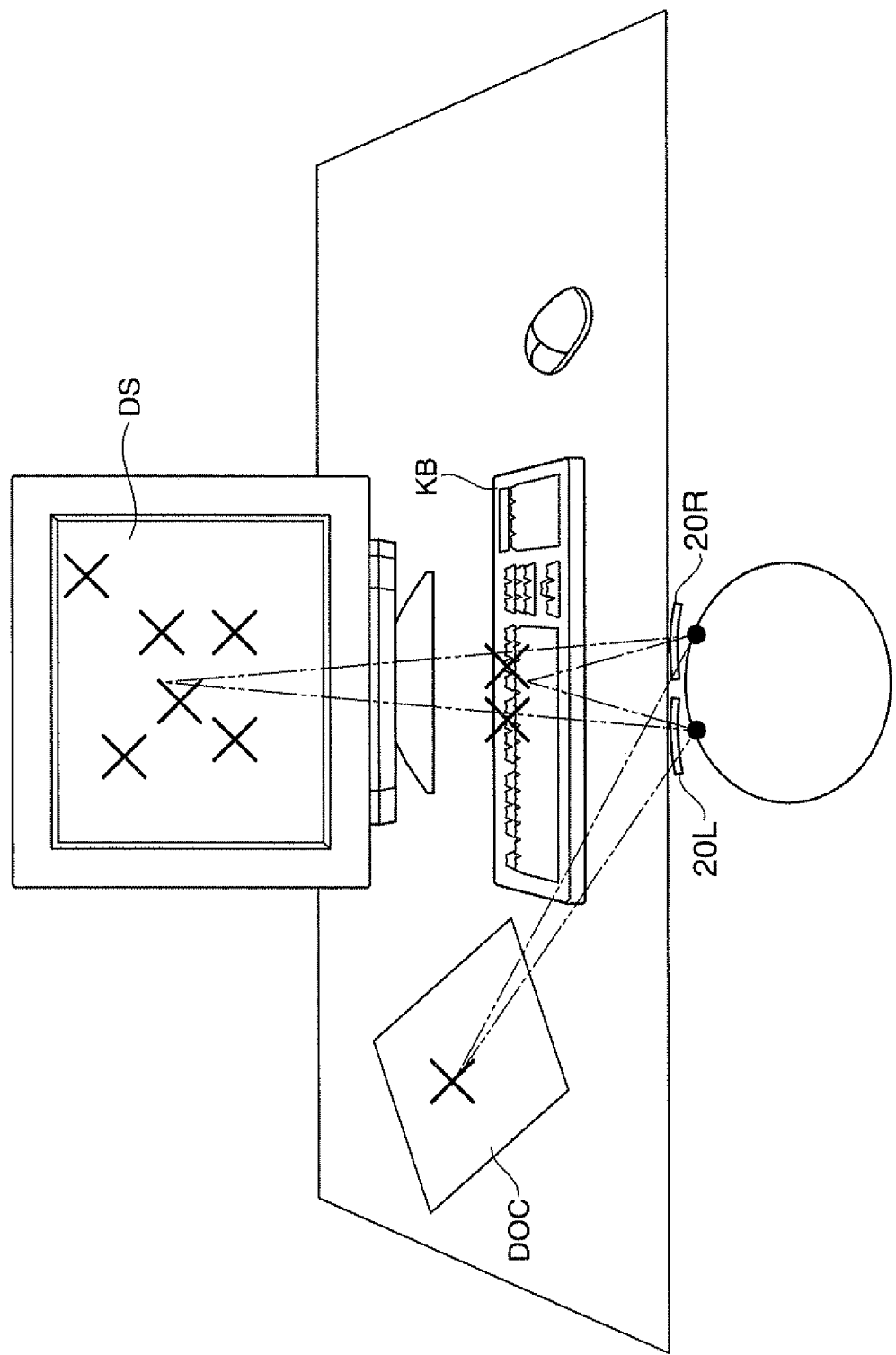
FIG. 16 describes a method for automatically determining priorities among target objects in the second embodiment.

In the second embodiment, the measurement is carried out in a desk work environment using the personal computer shown in FIG. 14. Specifically, a customer who wears an eye mark recorder does desk work, and the direction of the line of sight is measured at ten-second intervals for 90 seconds. The measurement period and other parameters are not limited to the values described above but can be changed as appropriate. FIG. 16 shows a measurement result. In FIG. 16, objects with many "X" marks are target objects, and the priorities among the target objects are determined based on the number of "X" marks. That is, the priorities among the target objects are as follows in descending order of priority: the display DS and the keyboard KB of the PC and the document DOC.

3-2. Action of Progressive-Power Lens Designing System

When the measurement using the eye mark recorder is completed, the shop attendant in the shop operates the input section 250 of the shop-side terminal 200 to instruct the output section 240 to display the input screen, to which a variety of data is inputted, and inputs necessary information (S11 and S12). In the second embodiment, the environment in which the spectacle lens is used is set in S12 as desk work using a personal computer, and the shop attendant inputs image data produced by the eye mark recorder, the name of each target object, the direction of and the distance to the target object in the environment described above.

In S13, the priority determining section 222 determines the priorities among the target objects based on the image data produced by the eye mark recorder. The priorities determined from FIG. 16 are as follows in descending order of priority: the display DS and the keyboard KB of the PC and the document DOC.

In the second embodiment, a description will be made of how to set optimization coefficients in S22 and how to calculate target dioptric power in S23.

In S22, the optimization coefficient setting section 122 extracts from the three target objects, the display DS and the keyboard KB of the PC and the document DOC, the document DOC having a third or lower priority, sets the on-lens position of the line of sight from the wearer who is viewing the document DOC as the quasi-distinct vision point 8, and sets an optimization coefficient at the quasi-distinct vision point 8. According to Table 3 described above, the optimization coefficient for the document DOC is one, and the optimization is so performed that a dioptric power error is reduced in the first place.

In S23, the dioptric power computing section 123 first sets the positions of the distinct vision points DP and NP and the quasi-distinct vision point 8 on the lens surface based on the directions of the target objects. Further, the target dioptric power at the quasi-distinct vision point 8 is calculated based on the prescribed far dioptric power and the distance to each of the target objects. For example, when the prescribed far dioptric power S is 0.00 D; the prescribed addition diopter ADD is 3.00 D; the near working distance Ln for the prescribed addition diopter is 30 cm; and the distance to the document DOC is 45 cm, the target dioptric power for the document DOC can be calculated below from Equation (1).

$$\text{target dioptric power}=0.00+3.00\times0.30/0.45=+2.00 \quad (D)$$

In the lens design in S26, the lens designing section 124 first adds refracting power to each of the distinct vision points DP and NP for higher priority target objects in such a way that the refracting power allows the wearer to distinctly view a target object located at the distance thereto. Thereafter, optimum average dioptric power (refracting power) is added to the quasi-distinct vision point 8. The optimization is then performed based on the target dioptric power and the optimization coefficient at the quasi-distinct vision point 8. In the present embodiment, since the target dioptric power and the optimization coefficient for the document DOC are 0.311 and 1, respectively, the optimization is so performed that the dioptric power error with respect to the target dioptric power approaches zero.

The following actions are the same as those in the first embodiment.

4. Examples

Specific Example 2 of the progressive-power lenses 20L and 20R of the second embodiment will next be described with reference to FIGS. 17A, 17B, 18A, and 18B.

In Example 2, it was assumed that the distance between the front of the spectacle wearer's head and the display DS was 50 cm; the distance between the front of the spectacle wearer's head and the keyboard KB was 40 cm; and the distance between the front of the spectacle wearer's head and the document DOC was 45 cm. The progressive-power lenses 20L and 20R of Example 2 were designed under the conditions described above.

Figures 17A, 17B:
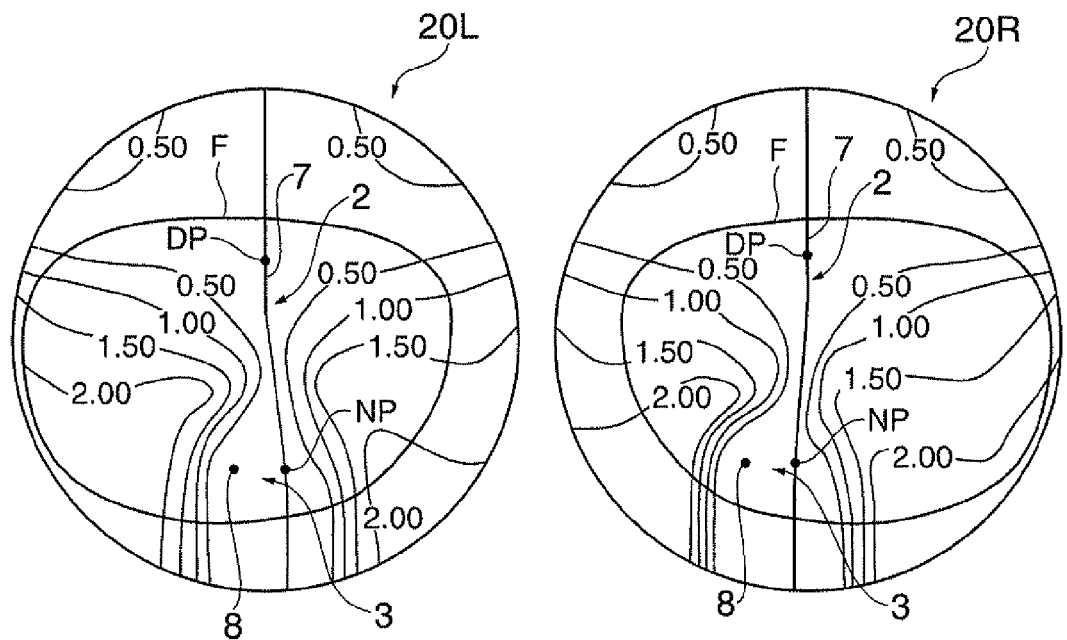
FIGS. 17A and 17B are astigmatism diagrams in Example 2, FIG. 17A corresponding to the left eye and FIG. 17B corresponding to the right eye.
Figures 18A, 18B:
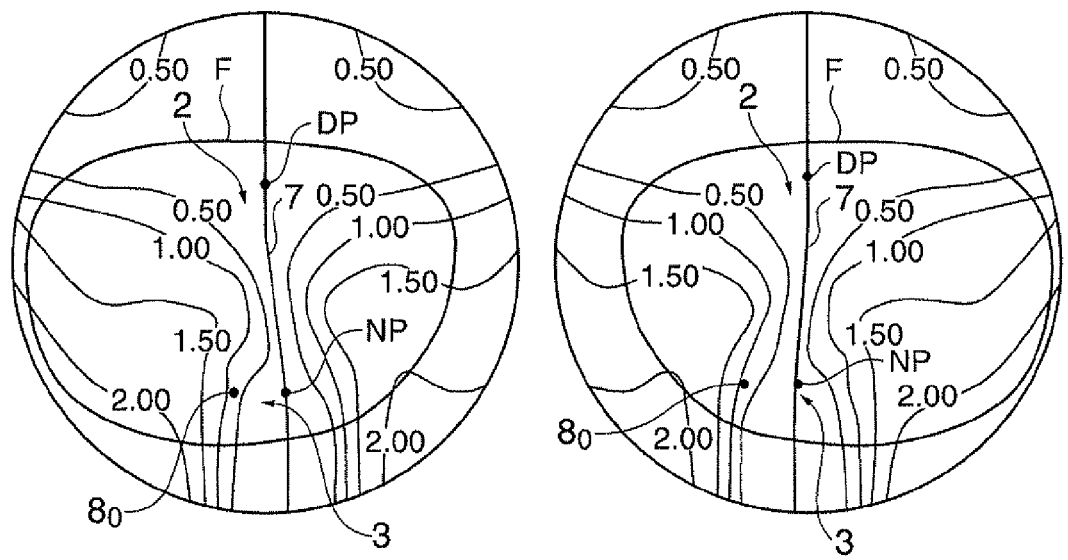
FIGS. 18A and 18B are astigmatism diagrams in related art, FIG. 18A corresponding to the left eye and FIG. 18B corresponding to the right eye.

FIGS. 17A and 17B are astigmatism diagrams in Example 2, and FIGS. 18A and 18B are astigmatism diagrams in related art in which no document-dedicated region is present. FIGS. 17A and 18A correspond to the left eye, and FIGS. 17B and 18B correspond to the right eye.

Comparison between FIGS. 17A and 18A for the left-eye progressive-power lenses shows no great difference in astigmatism at the distinct vision points DP and NP between Example 2 and the related art, but there is a large difference in astigmatism between the document-dedicated quasi-distinct vision point 8 in Example 2 and a point 8o in the related art.

Only a small amount of astigmatism is produced at the document-dedicated quasi-distinct vision point 8 in Example 2 and hence the spectacle wearer does not suffer from blurring, whereas a large amount of astigmatism is produced at the point 8o in the related art and hence the spectacle wearer suffers from blurring and cannot distinctly view the document.

That is, the distinct vision point NP and the document-dedicated quasi-distinct vision point 8 are arranged side by side so that a large distinct vision area is formed in Example 2, whereas only the distinct vision point NP is located in the distinct vision area in the related art. As a result, the amount of astigmatism increases in an area that is horizontally shifted from the distinct vision point NP because the area becomes part of the intermediate side region 5.

Comparison between FIGS. 17B and 18B for the right-eye progressive-power lenses shows no great difference in astigmatism at the distinct vision points DP and NP between Example 2 and the related art as in the case of the left-eye progressive-power lenses, but there is a large difference in astigmatism between the document-dedicated quasi-distinct vision point 8 in Example 2 and the point 8o in the related art.

5. Advantageous Effects in Second Embodiment

The second embodiment can therefore provide the following advantageous effect in addition to those provided in the first embodiment.

(6) Since a point shifted from the distinct vision points DP and NP, which are distinct vision points, is set as the document-dedicated quasi-distinct vision point 8 through which a third object is distinctly viewed and to which refracting power is added, in the personal computer operation the amount of blurring produced by the lens decreases even when the wearer views not only the display DS and the keyboard KB but also the document DOC, whereby desk work can be performed comfortably.

According to the progressive-power lens designing system 1, a progressive-power lens optimized for a specific work environment can be readily designed, as described above.

Variations

The invention is not limited to the embodiments described above. Variations and improvements made to the extent that the advantage of the invention is achieved can, of course, fall within the scope of the invention.

The above embodiments have been described with reference to the progressive-power lenses 10L and 10R dedicated to car driving and the progressive-power lenses 20L and 20R dedicated to personal computer operation. The invention is also applicable to applications other than those described above.

For example, in FIG. 19, progressive-power lenses 30L and 30R are dedicated to use by a guard or a receptionist and primarily used to distinctly view a visitor OP outside the building, a document DOC disposed close to the wearer, and a display DS disposed to the left of the document DOC. The display DS may alternatively be a screen of a personal computer. The document DOC is a visitor list or any other document.

Each of the lenses includes a point through which the visitor OP is distinctly viewed, which is one of the two distinct vision points, a point through which the document DOC is distinctly viewed, which is the other distinct vision point, a progressive region 4, and intermediate side regions 5, as in the second embodiment. A quasi-distinct vision point dedicated to a monitor is provided as a quasi-distinct vision point provided between the point through which the document DOC is distinctly viewed and the left intermediate side region 5 in the same position as that of the document-dedicated quasi-distinct vision point 8 in the second embodiment.

In the embodiment of the invention, when a progressive-power lens is dedicated to car driving, a quasi-distinct vision point may alternatively be used to view a monitor of a car navigation system disposed diagonally in front of the driver's seat or a rearview mirror provided in a front central portion of the ceiling of the car body.

In the embodiments described above, the priority determining section 222 of a shop-side terminal 200 recognizes the number of "X" marks in image data produced by an eye mark recorder to automatically determine the priorities among target objects. Alternatively, for example, a shop attendant in a shop may look at an image produced by the eye mark recorder, judges the priorities in accordance with the number of "X" marks, and inputs the priorities among the target objects through the input section 250 of the shop-side terminal 200.

Further, in the embodiments described above, an optimization coefficient at a quasi-distinct vision point is automatically set by the manufacturer-side terminal 100. Alternatively, for example, an optimization coefficient for each target object in a specific work environment may be inputted when a variety of data is inputted through a shop-side terminal 200 based on an instruction manual or any other similar document prepared in advance. As a result, the manufacturer-side terminal 100 does not need to set an optimization coefficient, whereby faster operation is achieved.

Further, in the embodiments described above, the progressive-power lens designing system 1 is so configured that the manufacturer-side terminal 100 is connected to the shop-side terminals 200 via the Internet 300. Alternatively, for example, a single terminal installed in a spectacle shop may include the entire configuration of the progressive-power lens designing system 1 described above, whereby processed results can be obtained more quickly because no communication over the Internet 300 is necessary.

The invention can be used to sell a progressive-power lens in a spectacle shop or any other similar location.

What is claimed is:

1. A progressive-power lens manufacturing method for manufacturing a progressive-power lens having two distinct vision points and at least one quasi-distinct vision point, the method comprising:

setting priorities among at least three target objects viewed through the progressive-power lens;

assigning a point on the progressive-power lens through which a target object having a third or lower level of the priorities is viewed as the quasi-distinct vision point and setting an optimization coefficient for the target object based on the distance between the quasi-distinct vision point and the target object and the magnitude of change in the distance;

setting dioptric power necessary at the quasi-distinct vision point by using a predetermined method;

optimizing the amounts of aberrations and a dioptric power error at the quasi-distinct vision point based on the optimization coefficient and the dioptric power; and manufacturing the progressive-power lens having the quasi-distinct vision point and the dioptric power set in the above steps.

2. The progressive-power lens designing manufacturing method according to claim 1, wherein the progressive-power lens is a spectacle lens for car driving, the target object having the third or lower level of the priorities is a side-view mirror of a car, and the optimization is performed by reducing aberrations at the quasi-distinct vision point in the first place.

3. The progressive-power lens designing manufacturing method according to claim 1, further comprising:

measuring the frequency at which the target objects are viewed with a sight line direction measurement apparatus; and determining priorities among the target objects in descending order of the frequency.

4. The progressive-power lens designing manufacturing method according to claim 1, which is implemented with a progressive-power lens designing manufacturing system in which a shop-side terminal is connected via a network to a manufacturer-side terminal installed in a lens manufacturer, the method further comprising:

an input step of inputting the following information to the shop-side terminal: basic information on the progressive-power lens including prescribed far dioptric power of a spectacle wearer and information on a specific work environment including the directions of at least three target objects on which the spectacle wearer fixes his or her eyes in the specific work environment, the distances thereto, the magnitudes of change in the distances, and the priorities among the target objects;

a transmission and reception step of transmitting the basic information and the information on the specific work environment from the shop-side terminal to the manufacturer-side terminal;

an optimization coefficient setting step performed by the manufacturer-side terminal, the optimization coefficient setting step comprising assigning points on the progressive-power lens through which target objects having second and higher levels of the priorities among the target objects are viewed as distinct vision points, assigning the point on the progressive-power lens through which the target object having the third or lower level of the priorities among the target objects is viewed as the quasi-distinct vision point, and setting an optimization coefficient at the quasi-distinct vision point based on the distance and the magnitude of change in the distance;

a dioptric power computation step of determining the positions of the distinct vision points and the quasi-distinct vision point based on the directions of the target objects and computing dioptric power necessary for each of the distinct vision points and the quasi-distinct vision point based on the prescribed far dioptric power and the distance to the corresponding target object;

a lens design step of performing lens design by optimizing the amounts of aberrations and dioptric power errors at the distinct vision points and the quasi-distinct vision point based on the optimization coefficient and the dioptric power;

a transmission and reception step of transmitting design data obtained in the lens design step from the manufacturer-side terminal to the shop-side terminal; and a result processing step of outputting the design data on a screen of the shop-side terminal.

5. A progressive-power lens designing manufacturing system in which a shop-side terminal is connected via a network to a manufacturer-side terminal installed in a lens manufacturer, the shop-side terminal comprising:

an input section to which the following information can be inputted: basic information on a progressive-power lens including prescribed far dioptric power of a spectacle wearer and information on a specific work environment including the directions of at least three target objects on which the spectacle wearer fixes his or her eyes in the specific work environment, the distances thereto, and the magnitudes of change in the distances and priorities among the target objects;

a shop-side transmission and reception section that transmits the basic information and the information on the specific work environment to the manufacturer-side terminal and receives design data from the manufacturer-side terminal; and a result processing section that outputs the design data on a designed lens received from the manufacturer-side terminal, and the manufacturer-side terminal comprising:

a manufacturer-side transmission and reception section that receives the basic information and the information on the specific work environment from the shop-side terminal and transmits the design data to the shop-side terminal;

an optimization coefficient processing section that assigns points on the progressive-power lens through which target objects having second and higher levels of the priorities among the target objects are viewed as distinct vision points, assigns a point on the progressive-power lens through which a target object having a third or lower level of the priorities among the target objects is viewed as a quasi-distinct vision point, and setting an optimization coefficient at the quasi-distinct vision point based on the distance and the magnitude of change in the distance;

a dioptric power computing section that determines the positions of the distinct vision points and the quasi-distinct vision point based on the directions of the target objects and computes dioptric power necessary for each of the distinct vision points and the quasi-distinct vision point based on the prescribed far dioptric power and the distance to the corresponding target object; and a lens designing section that performs lens design by optimizing the amounts of aberrations and dioptric power errors at the distinct vision points and the quasi-distinct vision point based on the optimization coefficient and the dioptric power;

the manufacturing system further comprising a manufacturing section that manufactures the progressive-power lens having the quasi-distinct vision point and the dioptric power set by the manufacturer-side terminal.

6. The progressive-power lens manufacturing system according to claim 5, further comprising:

an order placing and processing section that places an order for a progressive-power lens from the shop-side terminal to the manufacturer-side terminal based on the design data outputted from the result processing section and performs order processing in accordance with the placed order.

7. The progressive-power lens manufacturing system according to claim 5, further comprising:

a priority determining section that measures the frequency at which the target objects are viewed with a sight line direction measurement apparatus and determines priorities among the target objects in descending order of the frequency.

8. A progressive-power lens manufacturing apparatus, comprising:

an optimization coefficient processing section adapted to assign points on a progressive-power lens through which target objects having second and higher levels of priorities among the target objects are viewed as distinct vision points, to assign a point on the progressive-power lens through which a target object having a third or lower level of the priorities among the target objects is viewed as a quasi-distinct vision point, and to set an optimization coefficient at the quasi-distinct vision point based on a distance and a magnitude of change in the distance, based on following information: basic information on the progressive-power lens including prescribed far dioptric power of a spectacle wearer and information on a specific work environment including directions of at least three target objects on which the spectacle wearer fixes his or her eyes in the specific work environment, distances thereto, and magnitudes of change in the distances and priorities among the target objects;

a dioptric power computing section adapted to determine positions of the distinct vision points and the quasi-distinct vision point based on the directions of the target objects and compute a dioptric power necessary for each of the distinct vision points and the quasi-distinct vision point based on the prescribed far dioptric power and the distance to a corresponding target object;

a lens designing section adapted to perform lens design by optimizing amounts of aberrations and dioptric power errors at the distinct vision points and the quasi-distinct vision point based on the optimization coefficient and the dioptric power; and a manufacturer-side transmission and reception section adapted to receive the basic information and the information on the specific work environment from a shop-side terminal and to transmit design data to the shop-side terminal.

* * * * *